US008740113B2

(12) United States Patent
Roessle et al.

(10) Patent No.: US 8,740,113 B2
(45) Date of Patent: Jun. 3, 2014

(54) PRESSURE SWIRL FLOW INJECTOR WITH REDUCED FLOW VARIABILITY AND RETURN FLOW

(75) Inventors: Matthew L. Roessle, Temperance, MI (US); Thomas P. Mallin, Temperance, MI (US); Rick Simpson, La Salle, MI (US); Stephen Thomas, Laingsburg, MI (US); Keith Olivier, Jackson, MI (US); John Lowry, Brooklyn, MI (US)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 199 days.

(21) Appl. No.: 13/164,976

(22) Filed: Jun. 21, 2011

(65) Prior Publication Data
US 2011/0266370 A1 Nov. 3, 2011

Related U.S. Application Data

(63) Continuation-in-part of application No. 13/023,870, filed on Feb. 9, 2011.

(60) Provisional application No. 61/303,146, filed on Feb. 10, 2010.

(51) Int. Cl.
*B05B 1/30* (2006.01)

(52) U.S. Cl.
USPC ............... 239/585.1; 239/585.2; 239/585.4; 239/585.5

(58) Field of Classification Search
USPC .................... 239/459, 585.5, 585.1; 251/129.01–129.22; 335/234, 266
See application file for complete search history.

(56) References Cited

U.S. PATENT DOCUMENTS 2,235,834 A 6/1939 Gillette et al.
3,927,984 A 12/1975 Hartley
(Continued)

FOREIGN PATENT DOCUMENTS

DE 2418227 A1 10/1975
DE 2460111 A1 7/1976
(Continued)

OTHER PUBLICATIONS

International Search Report and Written Opinion dated Feb. 21, 2013 from corresponding international patent application PCT/US2012/052597 (8 pages).

(Continued)

*Primary Examiner* — Len Tran
*Assistant Examiner* — Viet Le
(74) *Attorney, Agent, or Firm* — Harness, Dickey & Pierce, P.L.C.

(57) ABSTRACT

A reagent injector with a cartridge design has a body with a reagent inlet, outlet, and a swirl chamber, which has an exit orifice that may be covered and uncovered by a solid, movable pintle. Reagent flows through the injector when the exit orifice is covered and uncovered to cool the injector. An insulator may be disposed between the injector body and a mounting flange connectable to an exhaust system. A flow path ensures cooling of an electromagnetic actuator. Reagent may bypass an orifice swirl chamber when the pintle blocks the exit orifice. Fluid may flow between an outside diameter of a pole piece and an inside diameter of an electromagnetic actuator, through an orifice chamber and return through a central bore housing a solid pintle, around which fluid may flow. Different inner injector body passages may direct fluid into an orifice distribution chamber and out to the solid pintle.

16 Claims, 24 Drawing Sheets

(56) References Cited

U.S. PATENT DOCUMENTS

| | | | |
|---|---|---|---|
| 3,958,757 A | 5/1976 | Happel et al. |
| 4,292,947 A | 10/1981 | Tanasawa et al. |
| 4,499,878 A | 2/1985 | Igashira et al. |
| 4,610,080 A | 9/1986 | Hensley |
| 4,742,964 A | 5/1988 | Ito et al. |
| 4,805,837 A | 2/1989 | Brooks et al. |
| 4,869,429 A | 9/1989 | Brooks et al. |
| 4,887,769 A | 12/1989 | Okamoto et al. |
| 4,938,455 A | 7/1990 | Grohmann |
| 5,307,997 A | 5/1994 | Wakeman |
| 5,522,218 A | 6/1996 | Lane et al. |
| 5,570,841 A | 11/1996 | Pace et al. |
| 5,605,042 A | 2/1997 | Stutzenberger |
| 5,713,327 A | 2/1998 | Tilton et al. |
| 5,857,478 A | 1/1999 | Davison et al. |
| 5,884,611 A | 3/1999 | Tarr et al. |
| 5,924,280 A | 7/1999 | Tarabulski |
| 5,943,858 A | 8/1999 | Hofmann et al. |
| 5,950,932 A | 9/1999 | Takeda et al. |
| 5,976,475 A | 11/1999 | Peter-Hoblyn et al. |
| 5,979,866 A | 11/1999 | Baxter et al. |
| 6,041,594 A | 3/2000 | Brenner et al. |
| 6,063,350 A | 5/2000 | Tarabulski et al. |
| 6,164,322 A | 12/2000 | Najmolhoda et al. |
| 6,168,098 B1 | 1/2001 | Brinn, Jr. |
| 6,192,677 B1 | 2/2001 | Tost et al. |
| 6,257,496 B1 | 7/2001 | Wyant |
| 6,273,120 B1 | 8/2001 | Hofmann et al. |
| 6,279,603 B1 | 8/2001 | Czarnik et al. |
| 6,293,097 B1 | 9/2001 | Wu et al. |
| 6,382,533 B1 | 5/2002 | Mueller et al. |
| 6,454,192 B2 | 9/2002 | Perry |
| 6,470,676 B2 | 10/2002 | Dolling et al. |
| 6,494,388 B1 | 12/2002 | Mueller et al. |
| 6,526,746 B1 | 3/2003 | Wu |
| 6,539,708 B1 | 4/2003 | Hofmann et al. |
| 6,708,904 B2 | 3/2004 | Itatsu |
| 6,739,525 B2 | 5/2004 | Dantes et al. |
| 6,742,330 B2 | 6/2004 | Genderen |
| 6,877,680 B2 | 4/2005 | Bauer et al. |
| 6,922,987 B2 | 8/2005 | Mital et al. |
| 6,988,681 B2 * | 1/2006 | Reiter ................ 239/584 |
| 7,021,558 B2 | 4/2006 | Chenanda et al. |
| 7,100,366 B2 | 9/2006 | Hager et al. |
| 7,237,731 B2 | 7/2007 | Dallmeyer et al. |
| 7,299,997 B2 | 11/2007 | Sayar |
| 7,306,172 B2 | 12/2007 | Sayar |
| 7,344,090 B2 | 3/2008 | Sayar |
| 7,467,749 B2 | 12/2008 | Tarabulski et al. |
| 7,861,520 B2 | 1/2011 | Broderick et al. |
| 8,024,922 B2 | 9/2011 | van Vuuren et al. |
| 8,047,452 B2 | 11/2011 | Martin et al. |
| 2002/0001554 A1 | 1/2002 | Czarnik et al. |
| 2004/0041112 A1 | 3/2004 | Goossens et al. |
| 2004/0187483 A1 | 9/2004 | Dalla Betta et al. |
| 2006/0108443 A1 | 5/2006 | Huffman et al. |
| 2008/0022663 A1 | 1/2008 | Dodge et al. |
| 2008/0180200 A1 * | 7/2008 | Gamble ................ 335/234 |
| 2009/0179087 A1 | 7/2009 | Martin et al. |
| 2009/0301067 A1 | 12/2009 | Dingle et al. |
| 2010/0192913 A1 | 8/2010 | Keidel et al. |
| 2011/0025439 A1 | 2/2011 | Rettinger et al. |
| 2011/0192140 A1 | 8/2011 | Olivier et al. |

FOREIGN PATENT DOCUMENTS

| | | |
|---|---|---|
| DE | 10241697 A1 | 4/2003 |
| EP | 1111231 A2 | 6/2001 |
| EP | 1291498 A2 | 3/2003 |
| EP | 2336544 A1 | 6/2011 |
| JP | 60-040777 | 4/1985 |
| JP | 9-504591 | 5/1997 |
| JP | 11-166410 | 6/1999 |
| JP | 2001-342928 | 12/2001 |
| JP | 2002-525491 A | 8/2002 |
| JP | 2003-083053 A | 3/2003 |
| JP | 2003-328735 A | 11/2003 |
| JP | 2004-176586 | 6/2004 |
| JP | 2005-201158 A | 7/2005 |
| JP | 2006-226162 | 8/2006 |
| JP | 3888518 | 12/2006 |
| JP | 2008-101564 A | 5/2008 |
| WO | WO-9606270 A1 | 2/1996 |
| WO | WO-00/18491 A1 | 4/2000 |
| WO | WO-2004029446 A1 | 4/2004 |
| WO | WO-2005108753 A1 | 11/2005 |

OTHER PUBLICATIONS

International Search Report and Written Opinion dated Oct. 25, 2011 from corresponding international patent application PCT/US2011/024208 (six pages).

International Search Report and Written Opinion dated Jan. 25, 2013 from corresponding international patent application PCT/US2012/040864 (8 pages).

International Search Report and Written Opinion dated Aug. 12, 2013 from corresponding international patent application PCT/US2013/037939 (12 pages).

International Search Report and Written Opinion dated Aug. 12, 2013 from corresponding international patent application PCT/US2013/037936 (9 pages).

* cited by examiner

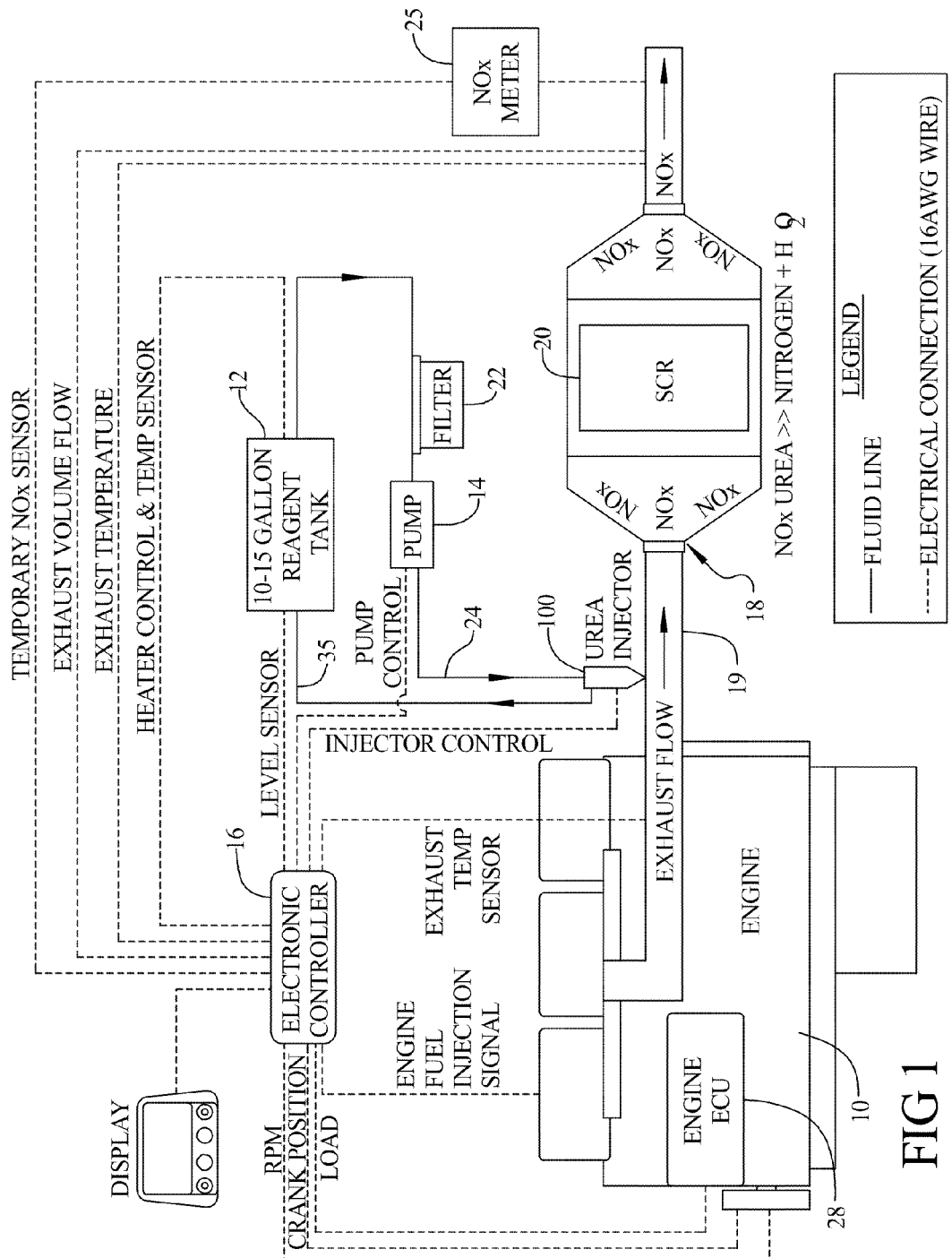

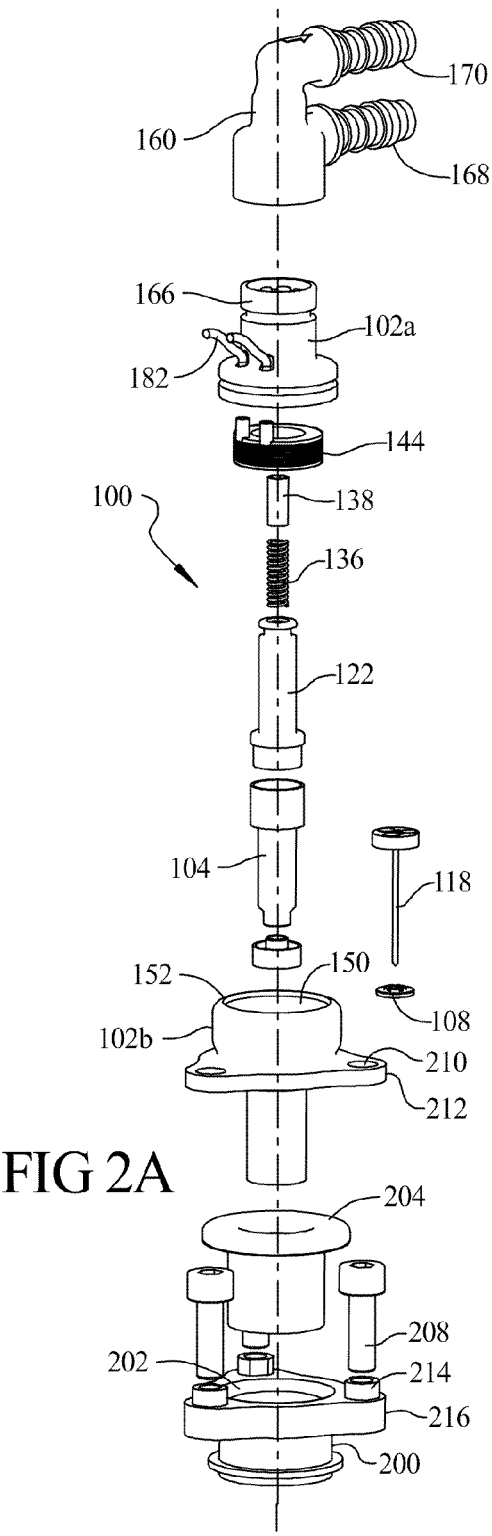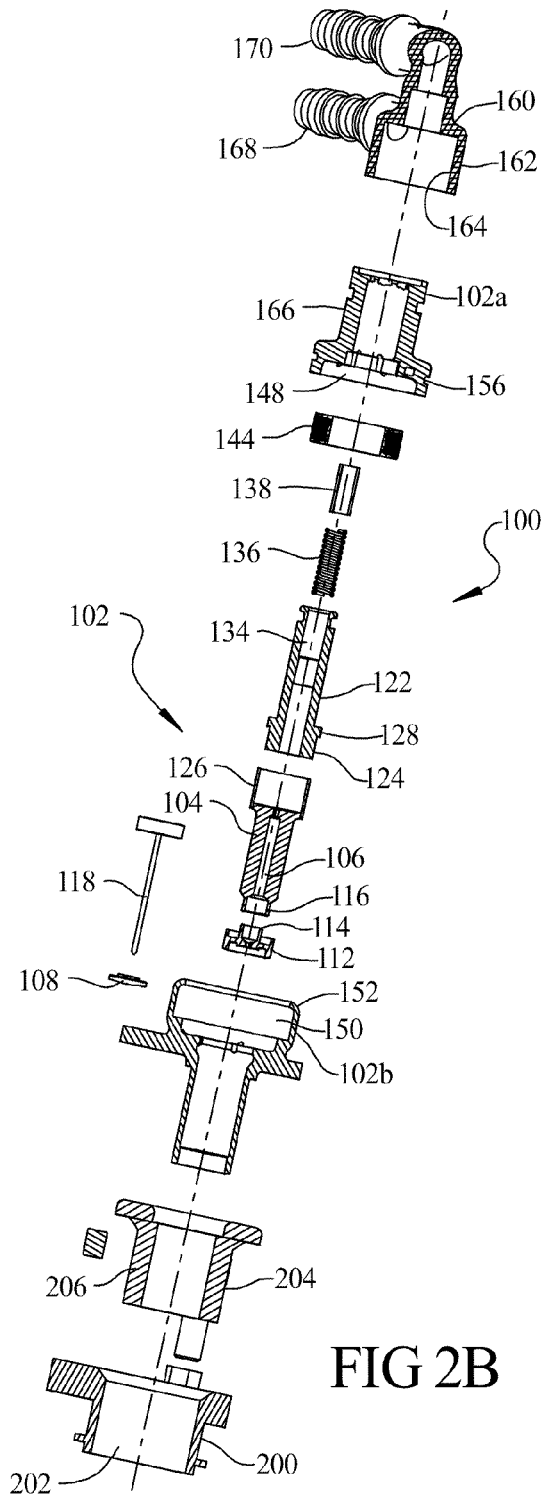
FIG 2A
FIG 2B

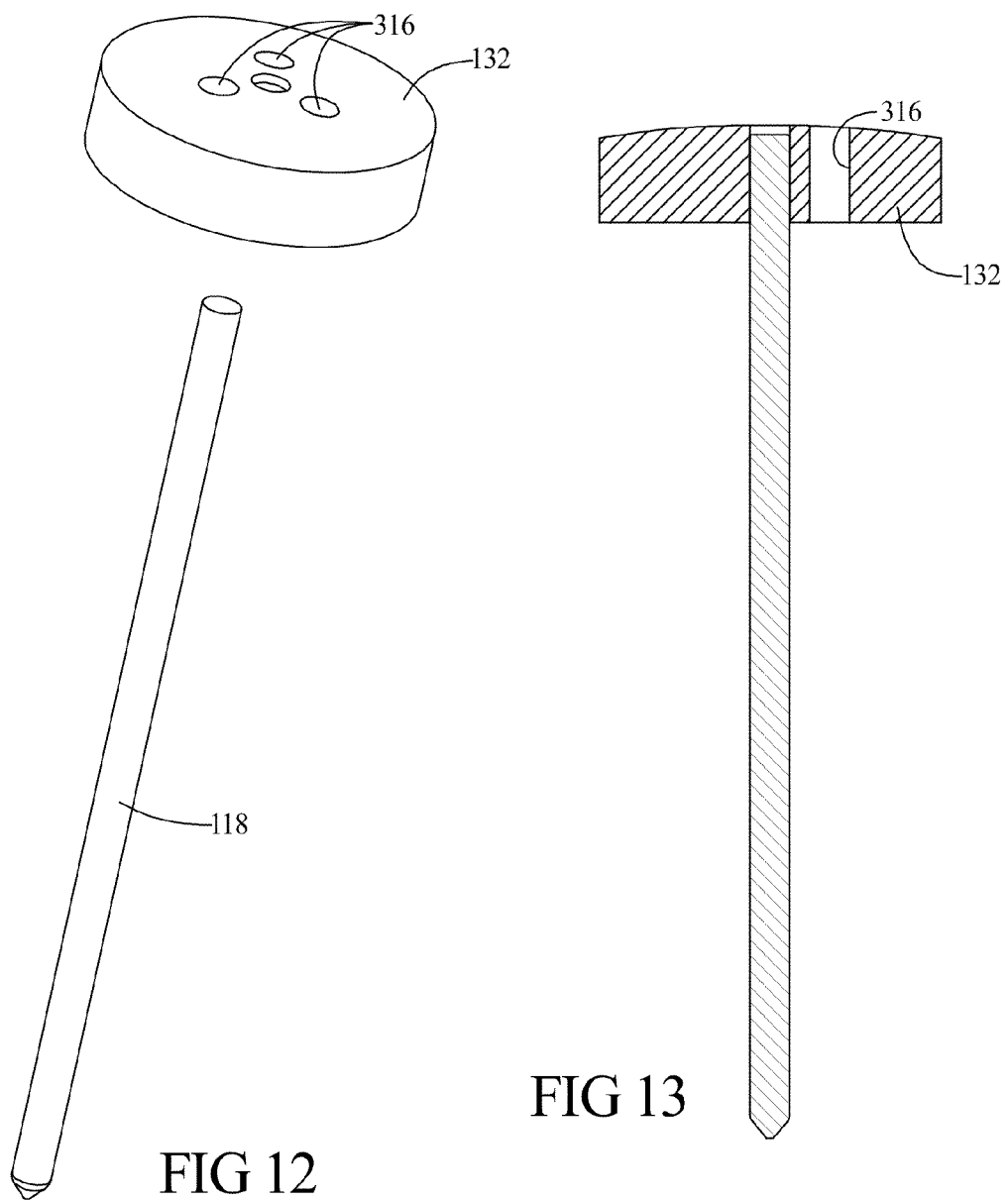

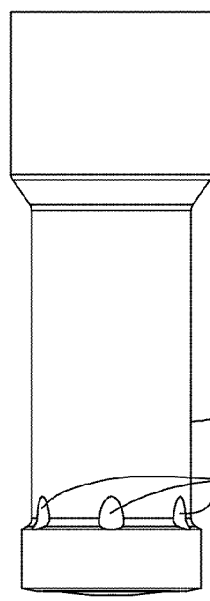
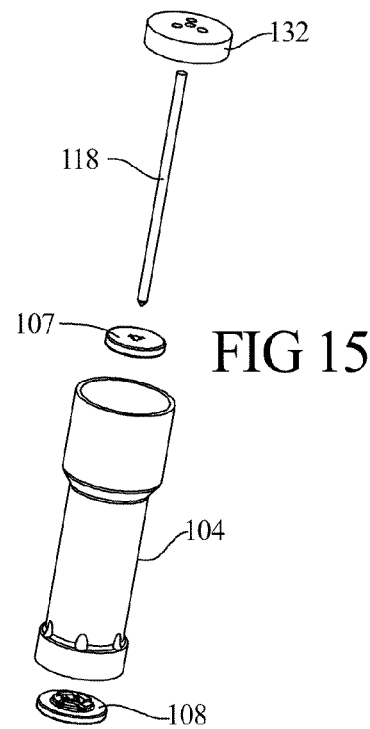
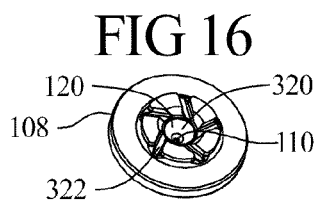
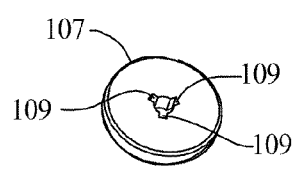
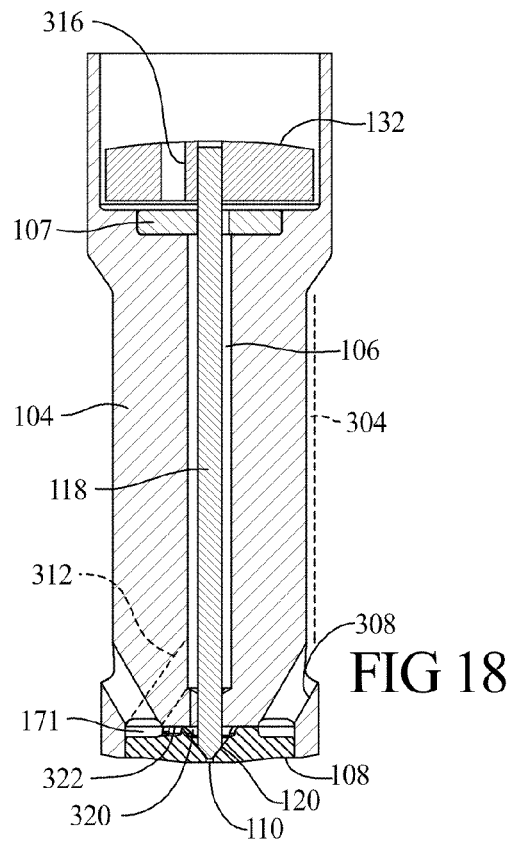
FIG 14
FIG 15
FIG 16
FIG 17
FIG 18

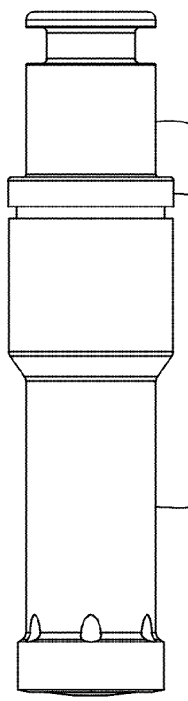
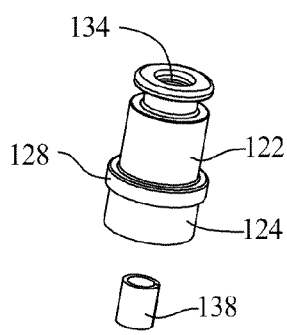
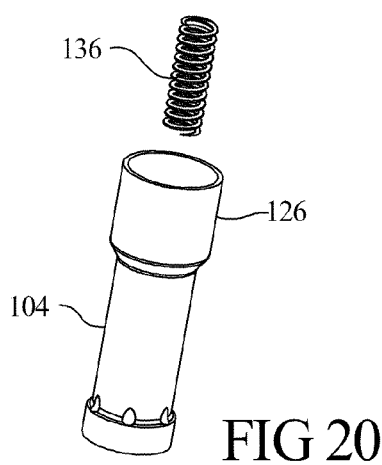
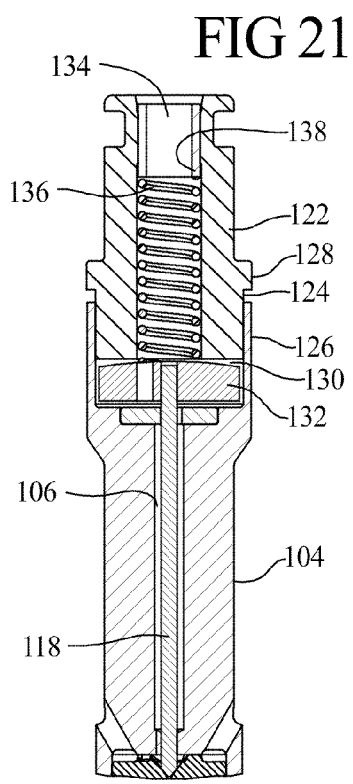
FIG 19
FIG 20
FIG 21

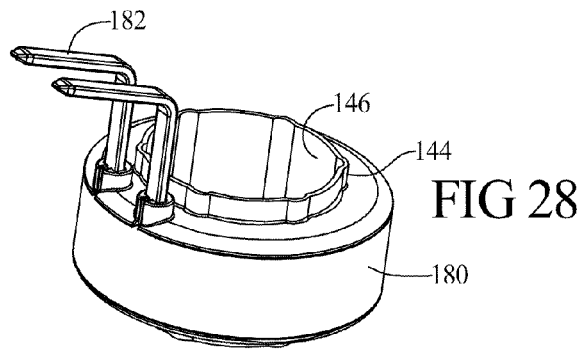
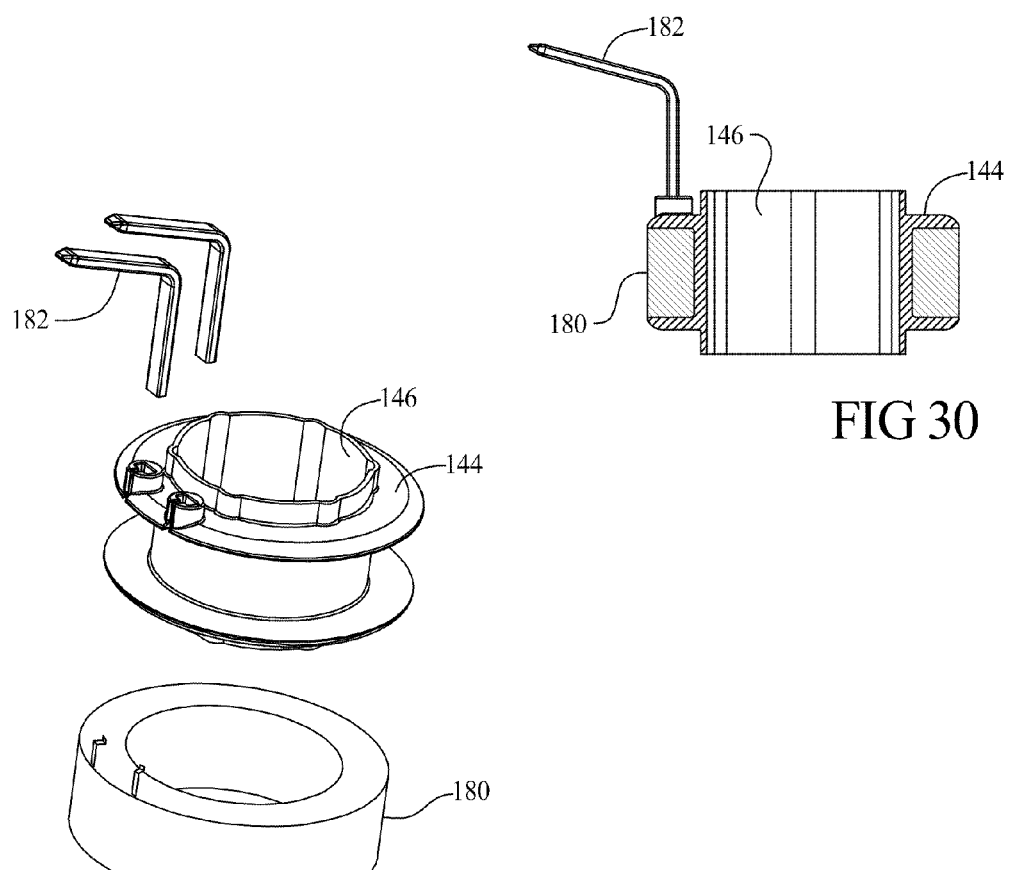
FIG 28
FIG 30
FIG 29

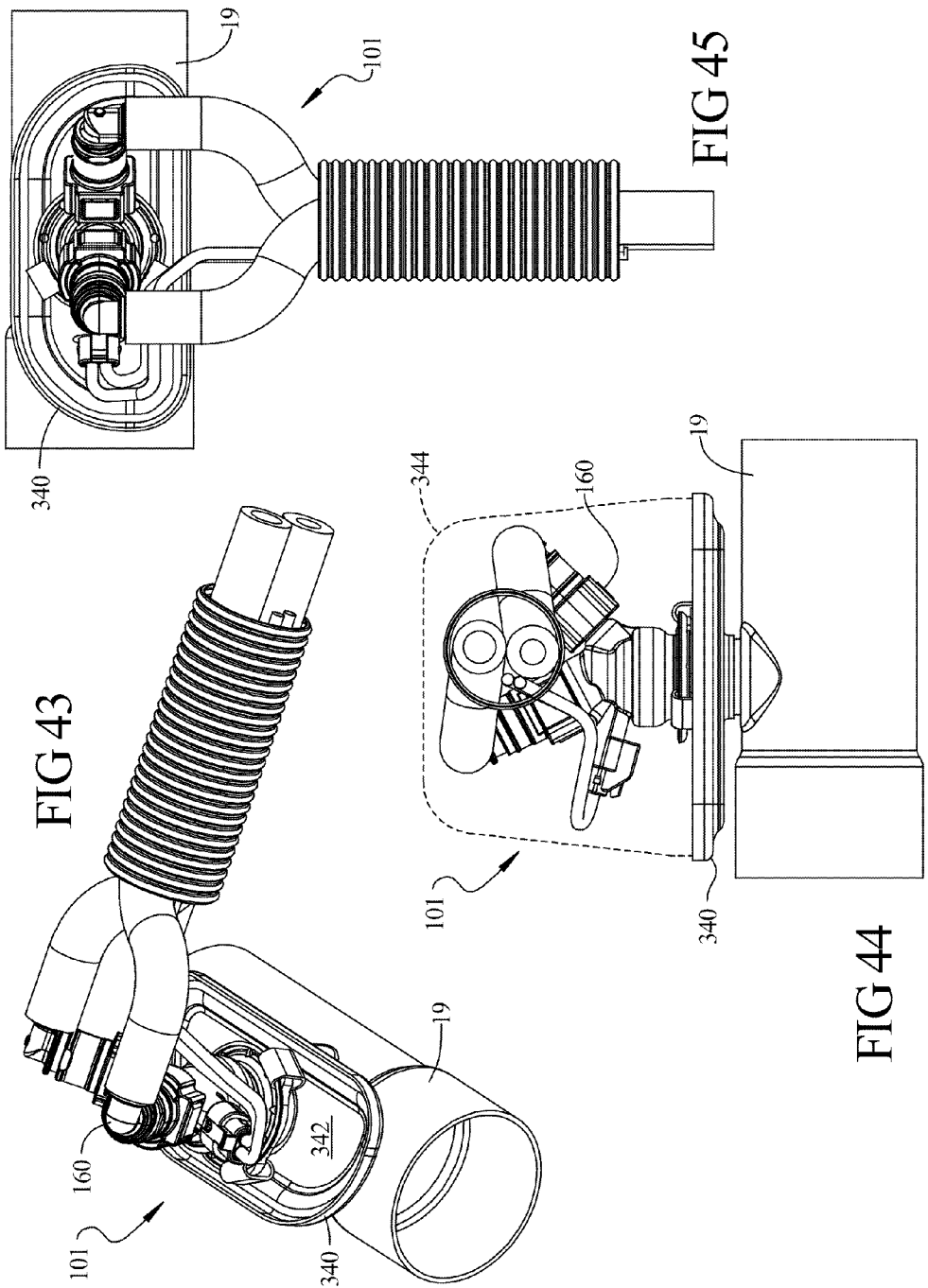

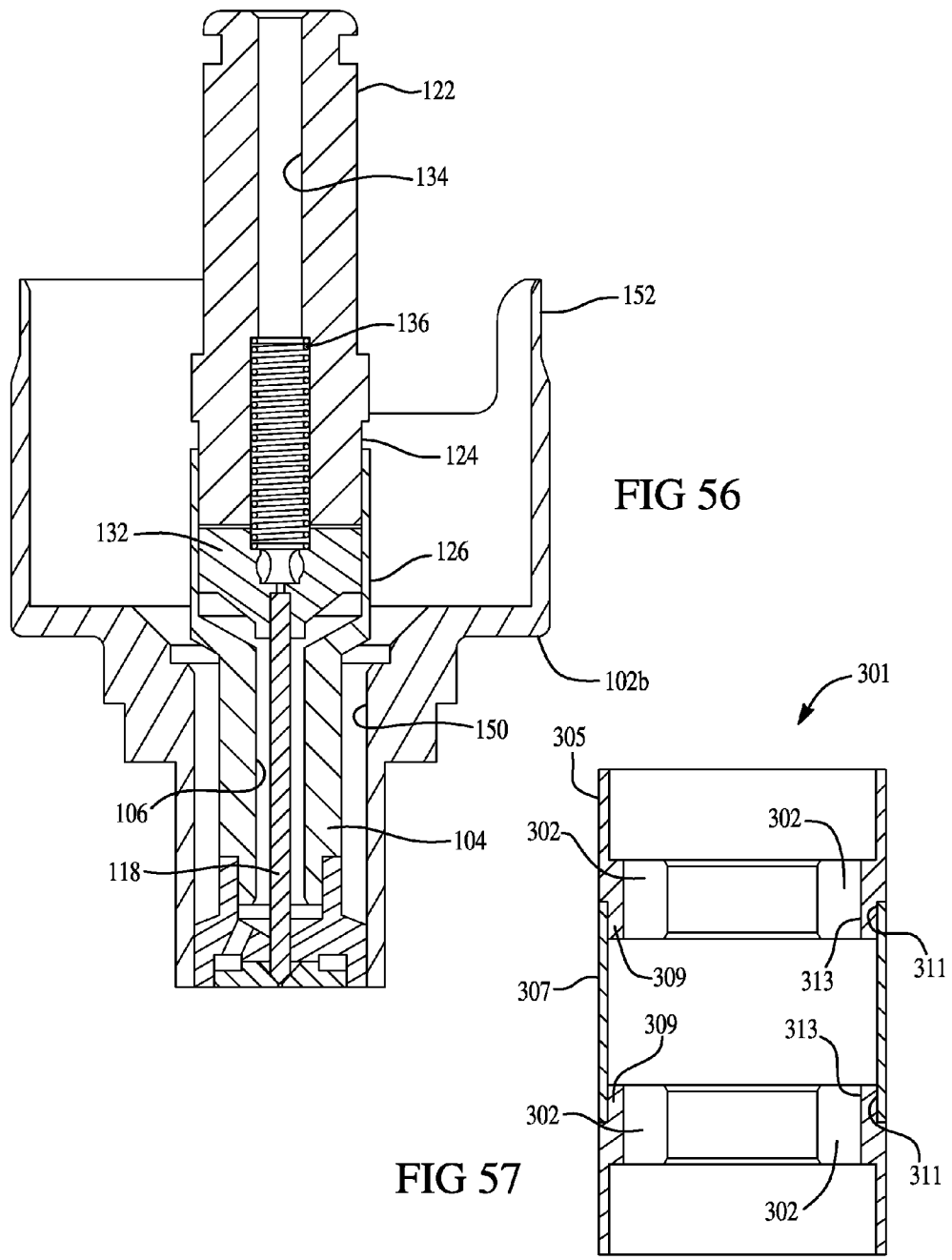

PRESSURE SWIRL FLOW INJECTOR WITH REDUCED FLOW VARIABILITY AND RETURN FLOW

CROSS-REFERENCE TO RELATED APPLICATIONS

This application is a continuation-in-part of U.S. patent application Ser. No. 13/023,870 filed on Feb. 9, 2011, which claims the benefit of U.S. Provisional Application No. 61/303,146, filed on Feb. 10, 2010. The entire disclosures of each of the above applications are incorporated herein by reference.

FIELD

The present disclosure relates to injector systems and, more particularly, relates to an injector system for injecting reagent, such as an aqueous urea solution, into an exhaust stream to reduce oxides of nitrogen (NOx) emissions from diesel engine exhaust.

BACKGROUND

This section provides background information related to the present disclosure which is not necessarily prior art. Lean burn engines provide improved fuel efficiency by operating with an excess of oxygen, that is, a quantity of oxygen that is greater than the amount necessary for complete combustion of the available fuel. Such engines are said to run "lean" or on a "lean mixture." However, this improved or increase in fuel economy, as opposed to non-lean burn combustion, is offset by undesired pollution emissions, specifically in the form of oxides of nitrogen (NOx).

One method used to reduce NOx emissions from lean burn internal combustion engines is known as selective catalytic reduction (SCR). SCR, when used, for example, to reduce NOx emissions from a diesel engine, involves injecting an atomized reagent into the exhaust stream of the engine in relation to one or more selected engine operational parameters, such as exhaust gas temperature, engine rpm or engine load as measured by engine fuel flow, turbo boost pressure or exhaust NOx mass flow. The reagent/exhaust gas mixture is passed through a reactor containing a catalyst, such as, for example, activated carbon, or metals, such as platinum, vanadium or tungsten, which are capable of reducing the NOx concentration in the presence of the reagent.

An aqueous urea solution is known to be an effective reagent in SCR systems for diesel engines. However, use of such an aqueous urea solution involves many disadvantages. Urea is highly corrosive and may adversely affect mechanical components of the SCR system, such as the injectors used to inject the urea mixture into the exhaust gas stream. Urea also may solidify upon prolonged exposure to high temperatures, such as temperatures encountered in diesel exhaust systems. Solidified urea will accumulate in the narrow passageways and exit orifice openings typically found in injectors. Solidified urea may also cause fouling of moving parts of the injector and clog any openings or urea flow passageways, thereby rendering the injector unusable.

In addition, if the urea mixture is not finely atomized, urea deposits will form in the catalytic reactor, inhibiting the action of the catalyst and thereby reducing the SCR system effectiveness. High injection pressures are one way of minimizing the problem of insufficient atomization of the urea mixture. However, high injection pressures often result in over-penetration of the injector spray plume into the exhaust stream, causing the plume to impinge on the inner surface of the exhaust pipe opposite the injector. Over-penetration also leads to inefficient use of the urea mixture and reduces the range over which the vehicle can operate with reduced NOx emissions. Only a finite amount of aqueous urea can be carried on a vehicle, and what is carried should be used efficiently to maximize vehicle range and reduce the need for frequent replenishment of the reagent.

Further, aqueous urea is a poor lubricant. This characteristic adversely affects moving parts within the injector and requires that relatively tight or small fits, clearances and tolerances be employed between adjacent or relatively moving parts within an injector. Aqueous urea also has a high propensity for leakage. This characteristic adversely affects mating surfaces requiring enhanced sealing resources in many locations.

It would be advantageous to provide methods and apparatus for injecting an aqueous urea solution into the exhaust stream of a lean burn engine such that heat and operational consistency can be more reliably managed. It would be further advantageous to provide improved cooling and/or heat management of the injector to prevent the urea from solidifying and to prolong the life of the injector components. It would be advantageous to minimize heat transfer to the injector from the exhaust pipe to minimize or eliminate urea deposit formation internal to the injector. It would also be advantageous to minimize heat transfer from the hot exhaust gas to the injector exit orifice to prevent soot and urea from being attracted to the relatively cool injector exit orifice. It would also be advantageous to provide an injector that does not leak for economical and environmental purposes.

Methods and apparatus of the present disclosure provide the foregoing and other advantages.

SUMMARY

This section provides a general summary of the disclosure, and is not a comprehensive disclosure of its full scope or all of its features.

In some embodiments, a method of directing reagent through an injector may involve: receiving a reagent from a reagent tank at a reagent inlet of a reagent injector; directing the reagent to a pole piece passage defined between an outside diameter of a pole piece and an inside diameter of an electromagnetic bobbin; directing the reagent from the pole piece passage to a collar passage defined between an outside diameter of a collar of an inner lower body and the inside diameter of the bobbin; directing the reagent from the collar passage to a lower body passage defined between an outside diameter of the inner lower body and an inside diameter of a lower section of the injector; and directing the reagent into a distribution passage defined by the inner lower body. The distribution passage may fluidly link the lower body passage to a distribution chamber defined by the inner lower body and an orifice plate. In some embodiments, from the distribution chamber, the method may include directing a first partial volume of the reagent to an orifice in the orifice plate and directing a second partial volume of the reagent to a reagent outlet of the injector.

In some embodiments, directing a first partial volume of the reagent to an orifice in the orifice plate may include: directing the first partial volume of the reagent through a plurality of slots in the orifice plate; moving a pintle and unblocking the orifice in the orifice plate; directing the first partial volume of the reagent through a plurality of slots in the orifice plate and through the orifice; and directing the first partial volume of the reagent to a central bore defined by the inner lower body.

In some embodiments, directing a second partial volume of the reagent to a reagent outlet may include: directing the second partial volume of the reagent through through holes defined in a guide plate through which a pintle passes; directing the second partial volume of the reagent through through holes of a pintle head, the pintle head attaching to and surrounding an end of the pintle; directing the second partial volume of the reagent through an interior of a bobbin of a magnetic coil; directing the second partial volume of the reagent through a central bore of a pole piece; directing the second partial volume of the reagent from the distribution chamber to at least one return passage defined by the inner lower body, wherein the return passage fluidly links the distribution chamber and a central bore defined by the inner lower body. Directing the second partial volume of the reagent around an outside diameter of a solid pintle residing within a central bore defined by the inner lower body.

In some embodiments, an injector for injecting reagent may employ an upper injector body, a lower injector body that may be secured to the upper injector body, a retaining plate defining a circular hole such that the retaining plate may be secured around the lower injector body via the circular hole, an insulator defining a circular hole such that the insulator may be secured around the lower injector body, and a mounting flange defining a circular hole such that the mounting flange may be secured around the insulator. The retaining plate may be secured directly against the lower injector body. The insulator may be secured directly against the lower injector body and the retaining plate. The mounting flange may be secured directly against the insulator. The retaining plate may define a plurality of through holes about a retaining plate peripheral edge and the mounting flange may define a plurality of blind holes about a mounting flange peripheral edge. A pin having a first pin end and a second pin end may be employed such that the first pin end resides within one of the blind holes of the mounting flange and the pin resides completely through one of the plurality of through holes of the retaining plate.

In some embodiments, a clip having a first clip end and a second clip end may be utilized in such a fashion that the clip may be secured over the retaining plate peripheral edge and the mounting flange peripheral edge. The retaining plate peripheral edge may define a peripheral concavity and the plurality of through holes of the retaining plate may be located within the peripheral concavity. The mounting flange peripheral edge may define a groove. The first clip end may reside within the groove of the mounting flange peripheral edge and the second clip end may reside within the peripheral concavity of the retaining plate peripheral edge. The clip may be C-shaped and the second clip end may reside on the second pin end. The insulator may define a tubular section with an inside diameter and an outside diameter that each have a series of alternating protrusions and recessions.

In some embodiments, a heat shield may be installed on the mounting flange using a through in the heat shield such that the mounting flange may protrude through the through hole of the heat shield. In some embodiments, the heat shield may be positioned between an injector upper body and an exhaust pipe. A cover may be mounted to the heat shield such that the cover surrounds the upper injector body, the lower injector body, and the mounting flange.

In some embodiments, an injector for injecting reagent may employ a cylindrical pole piece defining a pole piece first end and a pole piece second end. The pole piece may have a hollow interior from the pole piece first end to the pole piece second end. A spring pre-loader may be located within the hollow interior and against a portion of the first end. A spring may be located within the hollow interior and abut the spring pre-loader. An electromagnetic coil may be secured around a bobbin and the electromagnetic coil may itself surround an outside diameter of the cylindrical pole piece. In some embodiments, the cylindrical pole piece, spring pre-loader, spring and electromagnetic coil reside only within a cavity or chamber of the upper injector body.

A cylindrical inner lower body may reside within a lower injector body and define a longitudinal central bore. An inner lower body first end may define a first end first bore with a diameter larger than a diameter of the longitudinal central bore. The inner lower body first end may also define a first end second bore with a diameter larger than the longitudinal central bore and larger than the first end first bore. An inner lower body second end may define a second end bore with a diameter larger than the longitudinal central bore. The injector may further employ a solid pintle residing within the longitudinal central bore. A guide plate may be attached to an intermediate portion of the pintle. The guide plate may reside within the first end first bore. A pintle head may surround an end of the pintle of part of the end of the pintle. The pintle head may reside within the first end second bore; and an orifice plate residing within the second end bore. The cylindrical pole piece, spring pre-loader, spring, electromagnetic coil, cylindrical inner lower body, pintle, guide plate, pintle head and orifice plate may be part of a single cartridge.

In some embodiments, an injector body upper section may define a chamber within which the single cartridge, or part of the single cartridge, may insert into and reside. The guide plate may define one or more through holes for passage of fluid. Alternatively, the guide plate and the pintle together may define one or more through holes therebetween for passage of fluid. The pintle head may define at least one through hole for passage of fluid. The orifice plate and the inner lower body second end may define a distribution chamber therebetween. The orifice plate may define a plurality of grooves for passage of fluid to an exit orifice for exit from the injector. An interior surface of the injector body lower section and an inner lower body exterior surface may define a fluid pathway. The inner lower body may define a distribution passage fluidly linked to the pathway defined by an interior surface of the injector body lower section and an exterior surface of the inner lower body. The inner lower body may define a return passage that fluidly links the inner lower body central bore and the distribution chamber defined by the orifice plate and the inner lower body second end. The solid pintle may reside within the longitudinal central bore for passage of fluid around the solid pintle and through the longitudinal central bore.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 depicts a schematic diagram of an exemplary on-road diesel engine with a pollution emission control system using an injector according to the present teachings;

FIG. 2A depicts an exploded view of a reagent injector according to some embodiments of the present teachings;

FIG. 2B depicts an exploded cross-sectional view of the reagent injector of FIG. 2A according to some embodiments of the present teachings;

FIG. 12 depicts an exploded view of a pintle and plunger according to the present teachings;

FIG. 13 depicts a cross-sectional view of the pintle and plunger according to the present teachings;

FIG. 14 depicts a side view of a lower injector body and pintle according to the present teachings;

FIG. 15 depicts an exploded view of the lower injector body and pintle according to the present teachings;

FIG. 16 depicts a perspective view of an orifice plate according to the present teachings;

FIG. 17 depicts a perspective view of a guide member according to the present teachings;

FIG. 18 depicts a cross-sectional view of the lower injector body and pintle according to the present teachings;

FIG. 19 depicts a top perspective view of a pole piece and inner lower body according to the present teachings;

FIG. 20 depicts an exploded view of the pole piece and inner lower body according to the present teachings;

FIG. 21 depicts a cross-sectional view of the pole piece and inner lower body according to the present teachings;

FIG. 28 depicts a top perspective view of the magnetic coil assembly according to the present teachings;

FIG. 29 depicts an exploded view of the magnetic coil assembly according to the present teachings;

FIG. 30 depicts a cross-sectional view of the magnetic coil assembly according to the present teachings;

FIG. 43 depicts a top perspective view of the reagent injector incorporated into an exhaust system according to the present teachings;

FIG. 44 depicts a side view of the reagent injector incorporated into an exhaust system according to the present teachings;

FIG. 45 depicts a top view of the reagent injector incorporated into an exhaust system according to the present teachings;

FIG. 56 depicts a cross-sectional view of the lower section of the injector body and inner lower body cartridge according to the present teachings; and FIG. 57 depicts a cross-sectional view of the fluid sleeve according to the present teachings.

Corresponding reference numerals indicate corresponding parts throughout the several views of the drawings.

DETAILED DESCRIPTION

Figure 3B:
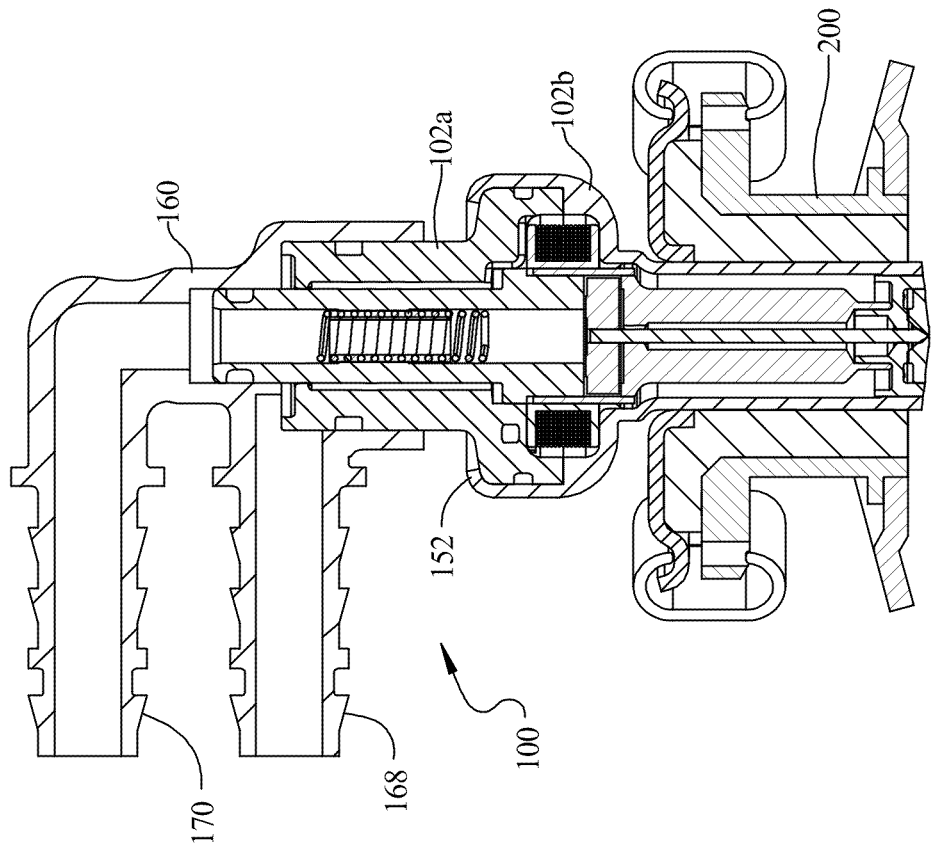
FIG. 3B depicts another cross-sectional view of the reagent injector.

Example embodiments will now be described more fully with reference to FIGS. 1-48 of the accompanying drawings.

It should be understood that although the present teachings may be described in connection with diesel engines and the reduction of NOx emissions, the present teachings can be used in connection with any one of a number of exhaust streams, such as, by way of non-limiting examples, those from diesel, gasoline, turbine, fuel cell, jet or any other power source outputting a discharge stream. Moreover, the present teachings can be used in connection with the reduction of any one of a number of undesired emissions. For additional description, attention should be directed to commonly-assigned U.S. patent application Ser. No. 12/275,539, filed Nov. 21, 2008, entitled "Method And Apparatus For Injecting Atomized Fluids", which is incorporated herein by reference. Thus, the present invention provides improved methods and apparatus structure for injecting a reagent, such as an aqueous urea solution, into an exhaust stream in order to reduce emissions from engine exhaust. Moreover, the present teachings provide improvements to prior art aqueous urea injectors, in particular, improvements to an aqueous urea injector including improved heat dissipation of critical components, reduced size and complexity of the reagent injector, and improved operation and function.

FIG. 1 depicts an example pollution control system for reducing NOx emissions from the exhaust of a diesel engine 10. In FIG. 1, solid lines between elements of the system denote fluid lines for reagent and dashed lines denote electrical connections. The system of the present teachings may include a reagent tank 12 for holding the reagent and a delivery module 14, such as a pump, for delivering the reagent from the reagent tank 12. The reagent may be a urea solution, a hydrocarbon, an alkyl ester, alcohol, an organic compound, E-85, water, or the like and can be a blend or combination thereof. It should also be appreciated that one or more reagents can be available in the system and can be used singly or in combination. Reagent tank 12 and delivery module 14 may form an integrated reagent tank/delivery module. Also provided as part of the system is an electronic injection controller 16, a reagent injector 100, which may be a low pressure reagent injector, and an exhaust system 18 having at least one catalyst bed 20.

Delivery module 14 may comprise a pump that supplies reagent from reagent tank 12 through an in-line filter 22 via a supply line 24. Reagent tank 12 may be polypropylene, epoxy coated carbon steel, PVC, or stainless steel and sized according to the application (e.g., vehicle size, intended use of the vehicle, and the like). Filter 22 may include a housing constructed of rigid plastic or stainless steel with a removable filter cartridge. A pressure regulator (not shown) may be provided to maintain the system at a predetermined pressure set point (e.g., relatively low pressures of approximately 60-80 psi, or in some embodiments a pressure of approximately 60-150 psi) and may be located in return line 26 from reagent injector 100. A pressure sensor may be provided in the flexible supply line 24 leading to the reagent injector 100. The system may also incorporate various freeze protection strategies to thaw frozen urea or to prevent the urea from freezing. For example, during system operation, regardless of whether or not the injector is releasing reagent into the exhaust gases, such as in an engine exhaust pipe, reagent is circulated continuously between (i.e. from and to) reagent tank 12 and reagent injector 100 to cool the injector and minimize the dwell time of the reagent in the injector so that the reagent remains cool.

Continuous reagent circulation may be necessary for temperature-sensitive reagents, such as aqueous urea, which tend to solidify upon exposure to elevated temperatures of 300° C. to 650° C. as may be experienced in an engine exhaust system. It has been found to be important to keep a given urea mixture or solution below 140° C. and preferably in a lower operating range between 5° C. and 95° C. to provide a margin of safety ensuring that solidification of the urea is prevented. Solidified urea, if allowed to form, may foul moving parts, openings and passageways of the injector, possibly rendering the injector useless for its intended purpose. It will be recognized that flow rates will depend on engine size and NOx levels.

The amount of reagent required may vary with load, engine RPM, engine speed, exhaust gas temperature, exhaust gas flow, engine fuel injection timing, and desired NOx reduction. All or some of the engine operating parameters may be supplied from engine control unit 28 via the engine/vehicle databus to reagent electronic injection controller 16. Reagent electronic injection controller 16 may also be included as part of engine control unit 28 if a given engine, vehicle or truck manufacturer agrees to provide such functionality. Exhaust gas temperature, exhaust gas flow and exhaust back pressure may be measured by respective sensors.

Figure 3A:
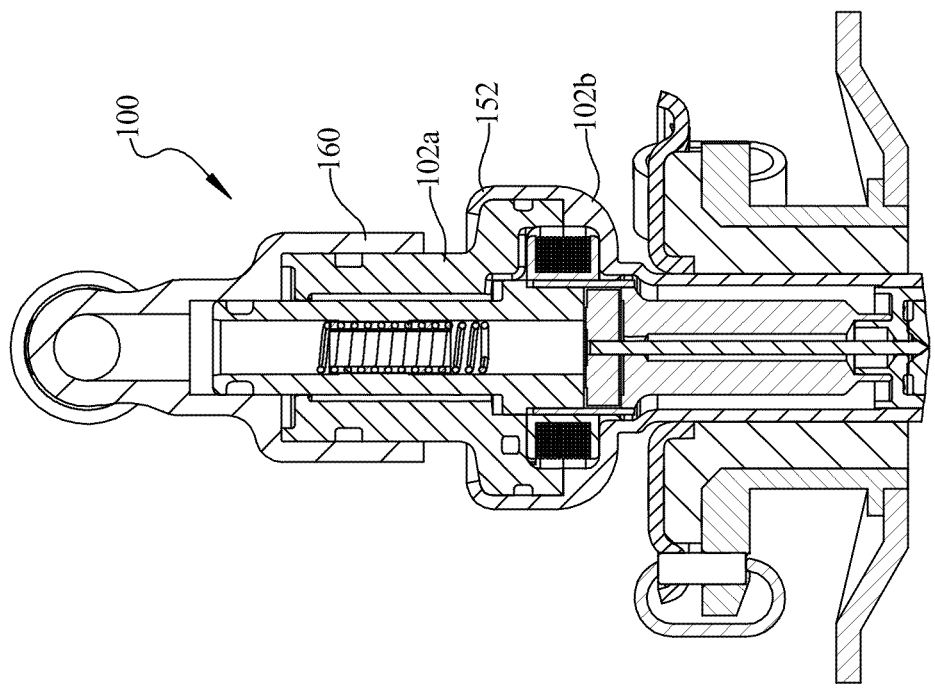
FIG. 3A depicts a cross-sectional view of the reagent injector.
Figure 5:
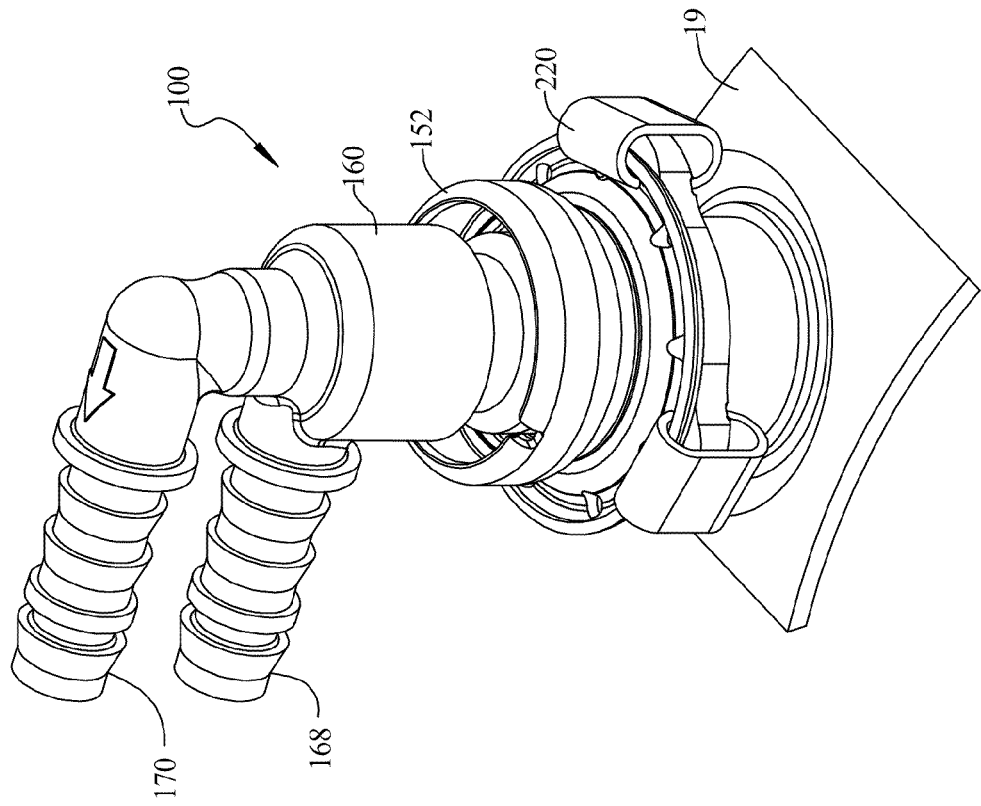
FIG. 5 depicts a top perspective view of the reagent injector mounted in an exhaust system.
Figure 4:
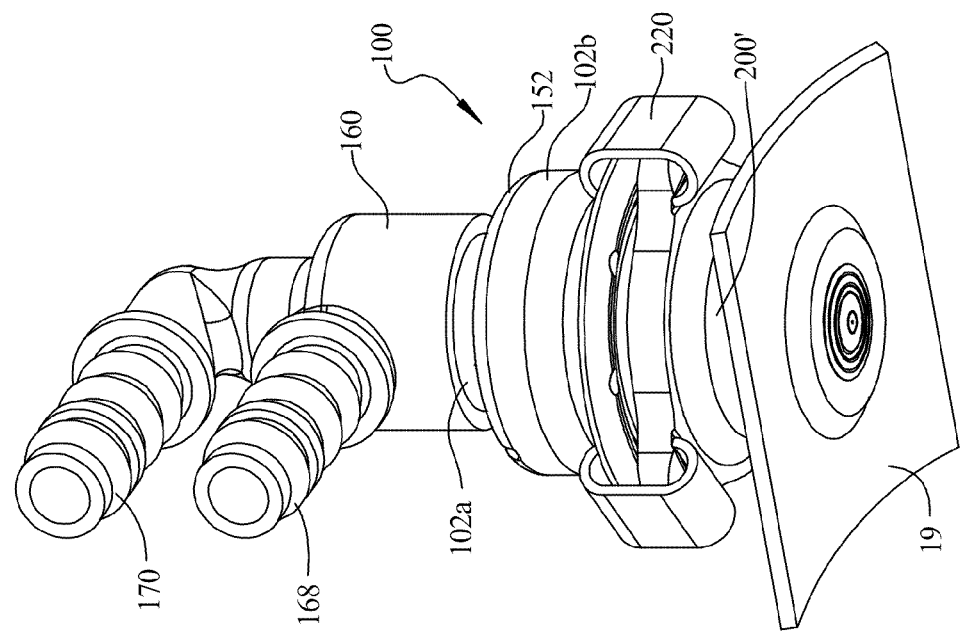
FIG. 4 depicts a bottom perspective view of the reagent injector mounted in an exhaust system.

With reference now including FIGS. 2A and 2B, an exemplary embodiment and variations of reagent injector 100 will be further described. In its exemplary use in the system depicted in FIG. 1, reagent injector 100 may have an injector body 102 having an injector body upper section 102a and an injector body lower section 102b. An elongated inner lower body 104 may be received within at least one of injector body upper section 102a and injector body lower section 102b. Elongated inner lower body 104 may define a cylindrical central bore 106, which may be in fluid communication with an orifice plate 108, which may define at least one exit orifice 110 (FIG. 16) that passes completely through the orifice plate 108. Inner lower body 104 may or may not be equipped with a separate guide plate 107 (FIG. 18). As depicted in FIGS. 2B, 3A and 3B, inner lower body 104 may be tapered at an end portion adjacent a pintle head of pintle 118. More specifically, instead of a separate guide plate to guide or maintain alignment of pintle 118 within a consistent central bore 106 (FIG. 3B), inner lower body 104 may be tapered or have a step-down in bore that has a smaller inner diameter than central bore 106. As depicted in FIGS. 2B, 3A and 3B, this step-down in bore at end of inner lower body 104 adjacent a pintle head, may be a guide member for pintle 118 and attached pintle head. Moreover, a pintle head of pintle 118 may act as a guide member to ensure that pintle head, which also may be referred to as a plunger, moves back and forth longitudinally within central bore 106, such as that depicted in FIGS. 49, 55, and 56.

Numerous orifices through orifice plate 108 are possible to permit fluid flow through orifice plate and into an exhaust gas stream within an exhaust pipe of the exhaust system 18 (FIGS. 1, 4, 5, and 43-45) of a diesel engine when injector 100 is mounted to the exhaust pipe. Depending upon application and operating environment, orifice plate 108 may be made of a carbide material, which may provide desired performance characteristics and may be more easily and cost-effectively manufactured. Moreover, limitations or disadvantages associated with other materials and manufacturing processes may be avoided, such as those associated with manufacturing complex part shapes. Carbide may provide additional advantages, such as insensitivity to brazing temperatures (870-980° C.), as opposed to other steels, such as carbon steels and tools steels, which may distemper. Carbide may also permit the hardness of surfaces of parts to be much greater than that achievable with most or all steels. As an example, using Mohs scale of mineral hardness, diamond may have a hardness of 10, carbide may have a hardness of 9-9.5 and hardened steel may be in the range of is 4-6. Thus, carbide is advantageous with regard to overall wear resistance. Moreover, carbide also has a wide range of toughness and can be "fine tuned" to have the best properties for a particular application.

Orifice plate 108 may be coupled to and retained by the elongated inner lower body 104 using an orifice plate holder 112. Orifice plate holder 112 may be integrally formed with inner lower body 104, if desired, as depicted in FIGS. 14, 15, and 18. In some embodiments, if orifice plate holder 112 is formed separately, orifice plate holder 112 may include a central male portion 114 (FIG. 2B) sized to be received and retained within a corresponding female portion 116 of elongated inner lower body 104. Surrounding exit orifice 110 may be a valve seat 120 (FIGS. 16 and 18), which may be conical or cone-shaped, or any practical shape; however, a conical shape is preferred as shown, for example, in FIG. 16. A valve member in the form of an elongated metering plug or pintle 118 (FIGS. 2A, 2B, 12, 13, 15, and 18) may be slidably mounted within central bore 106 and engagable with valve seat 120 to define a sealed and closed position when seated, and an unsealed and opened position when unseated. In some embodiments, orifice plate 108 may be coupled to inner lower body 104 via a press fit connection, which may then undergo brazing.

Figures 54, 55:
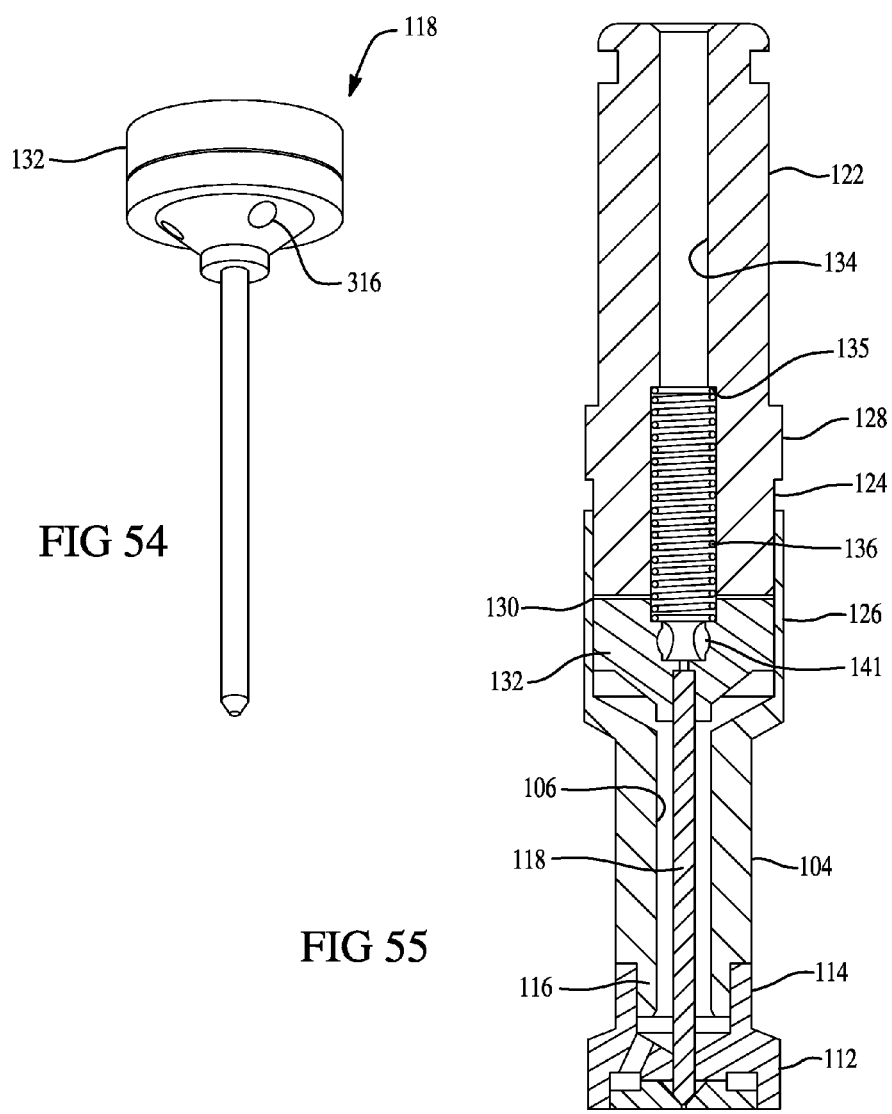
FIG. 54 depicts a perspective view of a pintle and pintle head according to the present teachings.
FIG. 55 depicts a cross-sectional view of the pole piece and inner lower body according to the present teachings.

Referring to FIGS. 2A, 2B, and 19-21, reagent injector 100 may employ an elongated pole piece 122 having an enlarged diameter end portion 124 sized to be received within a correspondingly sized collar portion 126 of elongated inner lower body 104. In some embodiments, elongated pole piece 122 may be press fit into inner lower body 104. Upon installation, the connection or press fit parts may also or alternatively be electron beam welded. A flange 128 of pole piece 122 can be sized to limit the engagement depth of pole piece 122 within elongated inner lower body 104 to define a space 130 therebetween (FIGS. 21 and 55). Space 130 can be sized to receive a pintle head 132 (FIGS. 12, 13, 21, and 55) of pintle 118 and permit limited and controlled axial movement of pintle 118 within central bore 106. In some embodiments, a seal member, such as an O-ring, can be provided within a seal depression 123 (e.g. FIG. 55) defined within pole piece 122 so that the O-ring is situated between injector body upper section 102a and pole piece 122 during final assembly to define and ensure a leak-proof fluid seal. Moreover, in some embodiments, pole piece 122 and inner lower body 104 can be electron beam welded or other permanent attachment method to maintain an insertable cartridge subassembly.

In some embodiments, pintle head 132 may be attached to a shaft of pintle 118 via a press fit and/or furnace braze. Pintle head 132, which also may be referred to as a pintle head, may include through holes 316 (FIGS. 13, 18, and 54) formed therein to reduce hydraulic pressure and provide a return flow path for fluid passage. Guide plate 107 (FIGS. 15, 17 and 18), which may also be referred to as a guide member, may support pintle 118 to provide guided movement of pintle 118 in central bore 106. Guide plate 107 may comprise a plurality of slots or holes 109 to permit fluid flow therethrough. That is, guide plate 107 may define one or more slots or holes 109 that are through slots to permit fluid to flow through, even when pintle 118 is attached to guide plate 107.

As depicted in FIGS. 2A, 2B, 20, and 21, elongated pole piece 122 may further define a central bore 134 extending therethrough about a central axis of elongated pole piece 122. Central bore 134 may receive a return spring 136 and an optional spring pre-loader 138. Spring pre-loader 138 may be sized and/or shaped to engage and preload return spring 136. More specifically, spring pre-loader 138 may contact a structure formed within central bore 134 of pole piece 122 to prevent movement therein and serve to limit the space available for extension of return spring 136. Spring pre-loader 138 may be retained in any one of a number of conventional ways, including using obstructions or features formed in central bore 134 that prevent passage of spring pre-loader 138. Alternatively, adjustable mechanisms, such as retaining screws, may be used to limit or adjust the position of spring pre-loader 138. In this way, return spring 136 is permitted to exert a biasing force upon pintle head 132 of pintle 118, thus urging an end of pintle 118 into engagement with valve seat 120 and thus closing or preventing fluid flow through orifice plate 108. Return spring 136 and spring pre-loader 138 comprise a central bore that is hollow and permits fluid flow through a central portion of return spring 136 and a central portion through pre-loader 138. As will be discussed, in some embodiments, pre-loader 138 made be eliminated and/or integrally formed within central bore 134.

Figure 34:
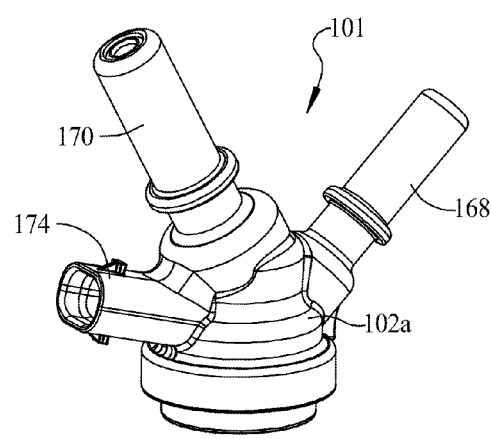
FIG. 34 depicts a top perspective view of the fluid coupling assembly according to the present teachings.
Figure 36:
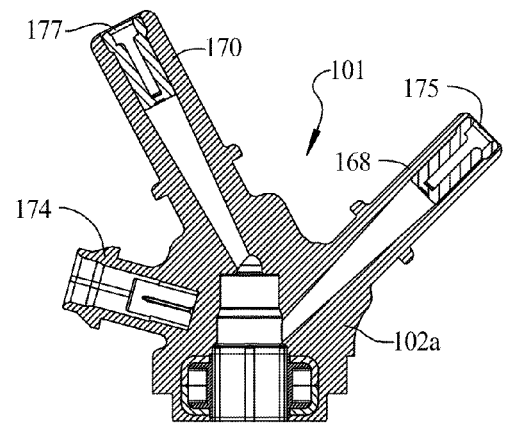
FIG. 36 depicts a cross-sectional view of the fluid coupling assembly according to the present teachings.
Figure 35:
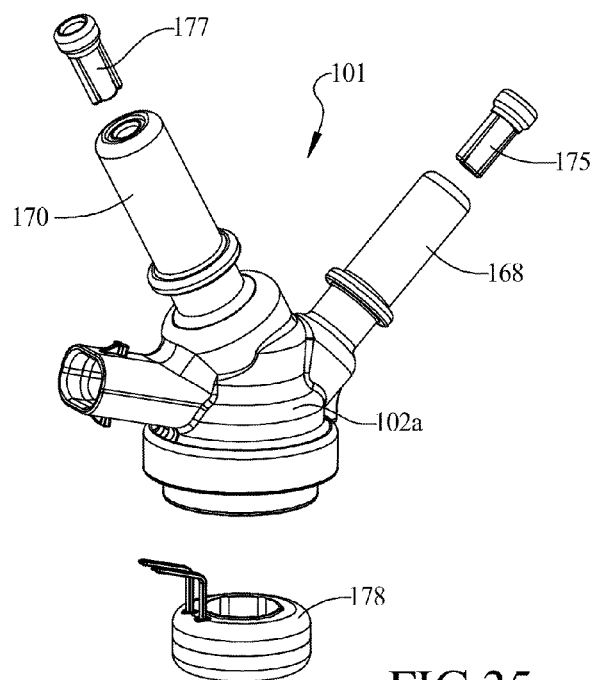
FIG. 35 depicts an exploded view of the fluid coupling assembly according to the present teachings.
Figure 37:
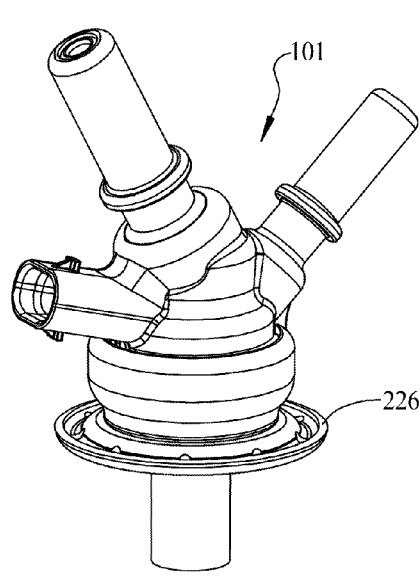
FIG. 37 depicts a top perspective view of the partial reagent injector according to the present teachings.
Figure 39:
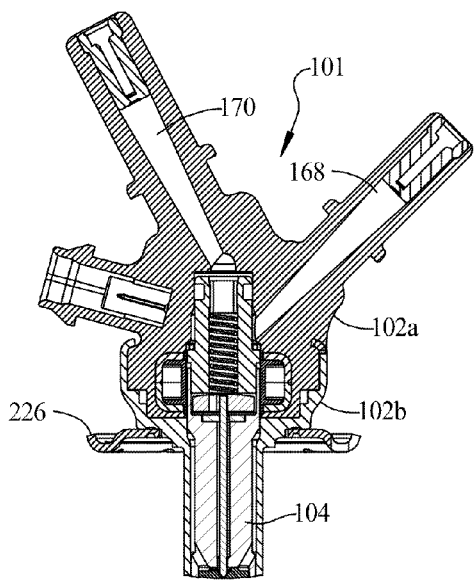
FIG. 39 depicts a cross-sectional view of the partial reagent injector according to the present teachings.
Figure 38:
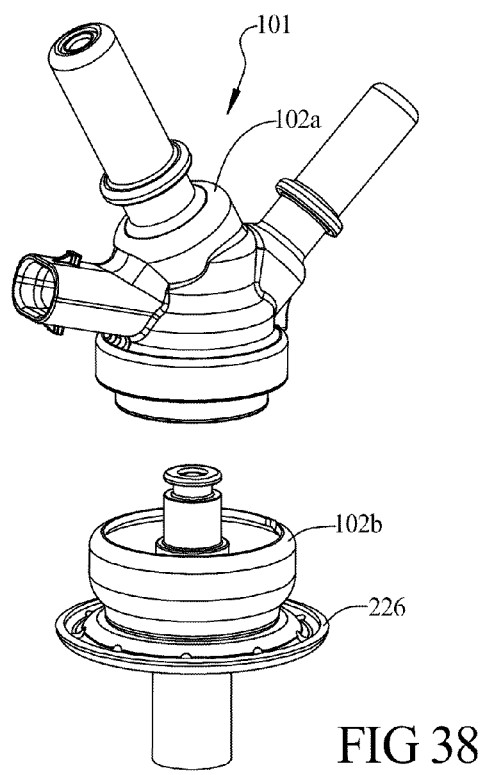
FIG. 38 depicts an exploded view of the partial reagent injector according to the present teachings.
Figure 40:
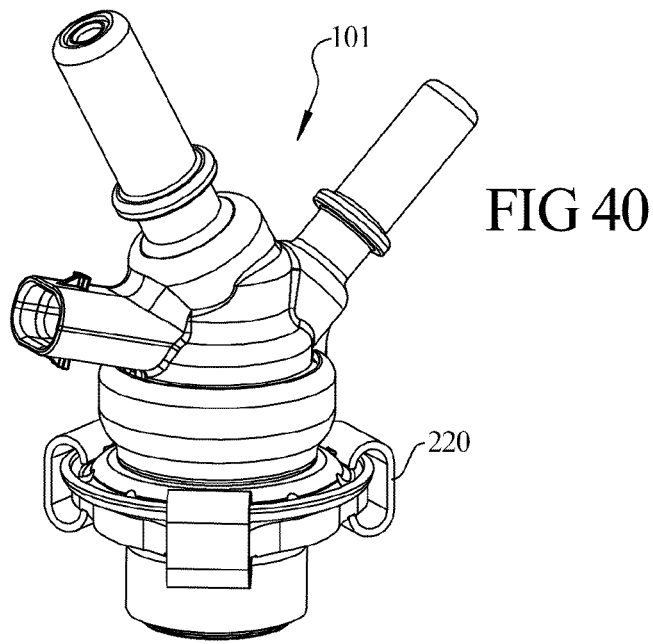
FIG. 40 depicts a top perspective view of the reagent injector according to the present teachings.
Figure 49:
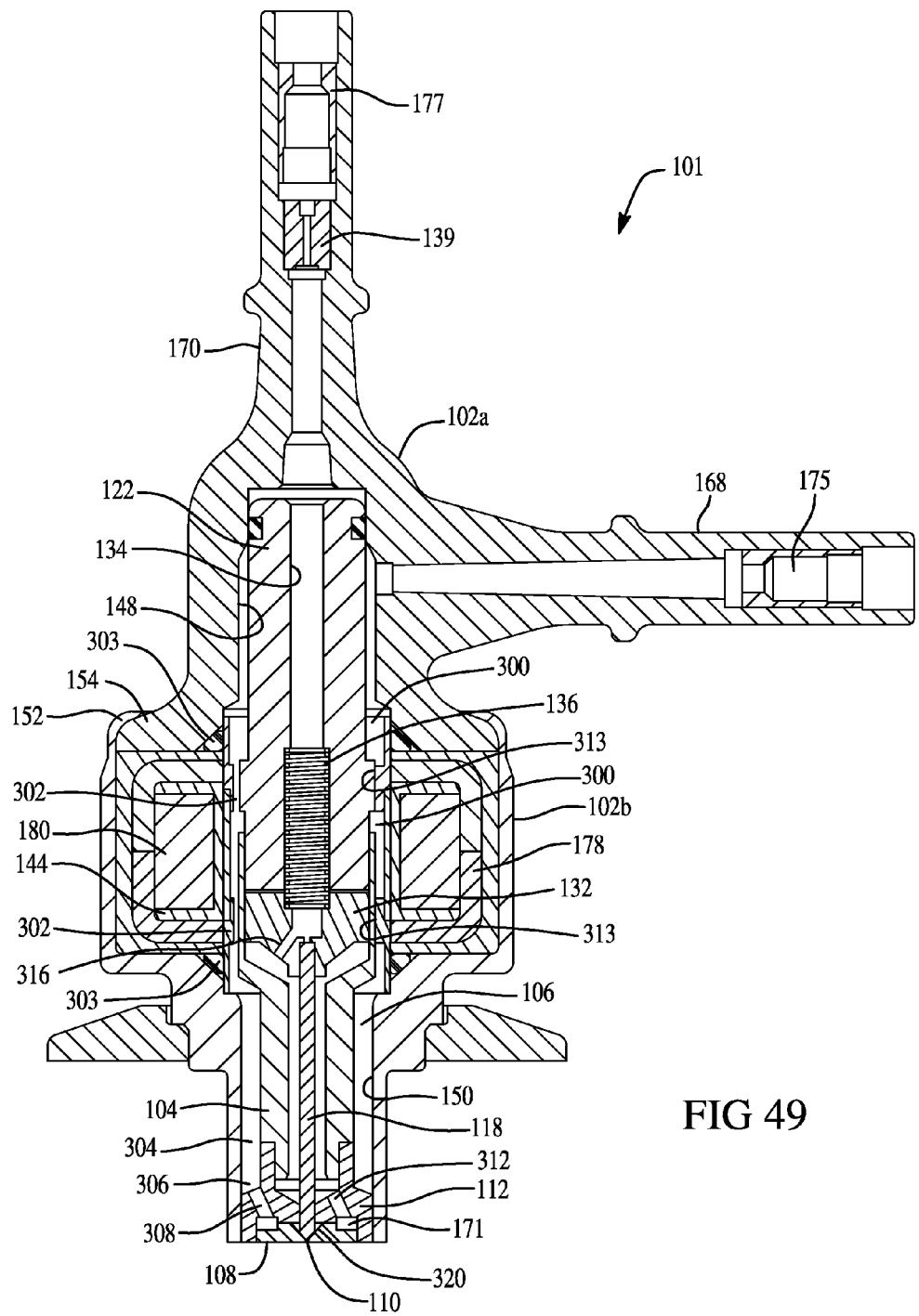
FIG. 49 depicts a partial cross-sectional view of the reagent injector according to the present teachings.
Figure 50:
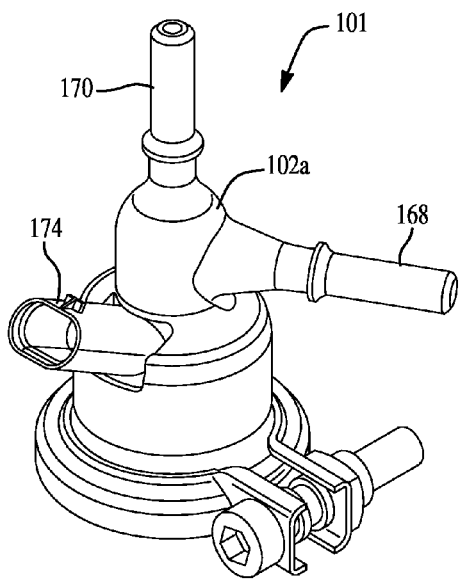
FIG. 50 depicts a top perspective view of the fluid coupling assembly according to the present teachings.
Figure 51:
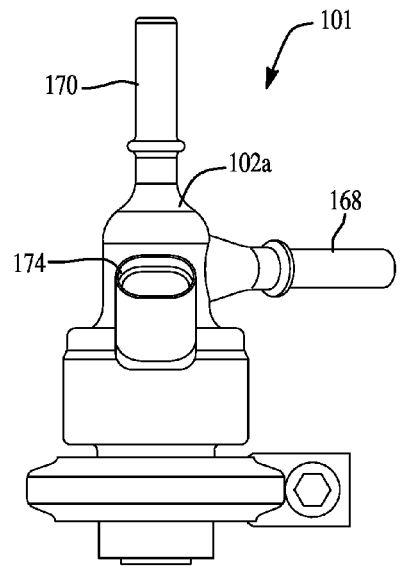
FIG. 51 depicts a side view of the fluid coupling assembly according to the present teachings.
Figure 52:
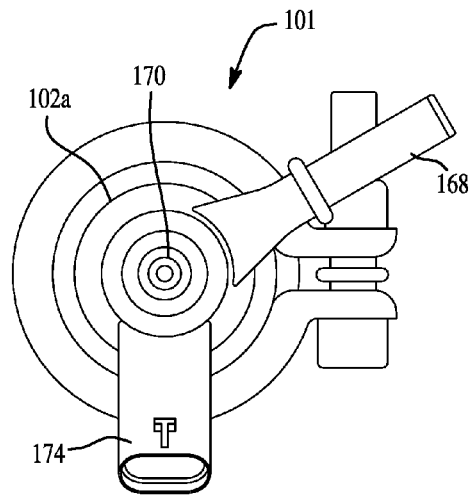
FIG. 52 depicts a top view of the fluid coupling assembly according to the present teachings.
Figure 53:
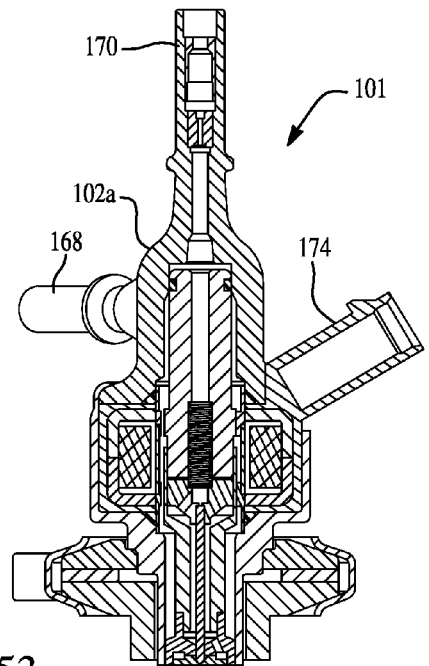
FIG. 53 depicts a partial cross-sectional view of the reagent injector according to the present teachings depicting the injector and mount arrangement.

FIGS. 6-8 and 49-53 depict injectors 101 with various configurations or arrangements of fluid inlets and fluid outlets that may protrude from injector body upper sections 102a. It should be recognized that although injector 101 may differ from injector 100, portions of each can be incorporated into the other without departing from the present teachings. Therefore, it should be understood that at times the term injector 100 may be used generically in reference to both injector 100 and injector 101. With reference to the noted figures, injector body upper section 102a may be formed or molded from a single material, and as a single piece as opposed to two pieces, such that a fluid inlet, a fluid outlet, and an electrical connector housing may all be molded in a single piece as a portion of injector body upper section 102a. Such a construction facilitates insertion of a cartridge of components pre-assembled as a cartridge, as depicted in FIGS. 21 and 55, which will be discussed later. FIGS. 4-6 and 50-53 also depict an injector mount to facilitate mounting of injectors 101 to an exhaust component. FIGS. 34-36 also each depict an injector 101 without a mount. FIGS. 34-36 and 50-53 further depict example positions of a fluid inlet 168, a fluid outlet 170 and electrical connector housing 174. FIG. 35 depicts injector 101 with an inlet port filter 175 and an outlet port filter 177 removed from inlet 168 and outlet 170, respectively. FIG. 35 also depicts a flux frame 178 of an encapsulated electromagnetic coil and an associated bobbin, all removed from injector body upper section 102a. FIGS. 36 and 49 are cross-sectional views depicting inlet filter 175 installed within inlet 168, outlet filter 177 installed within outlet 170, and electromagnetic coil and an associated bobbin surrounded by flux frame 178 installed within injector body upper section 102a. FIG. 49 further depicts a restrictor orifice 139 being disposed in outlet 170. Restrictor orifice 139 can be threadly engaged or press-fit within outlet 170 and be made of 303 stainless steel, in some embodiments.

During assembly (FIGS. 9-42, 49, and 54-57), optional spring pre-loader 138 and return spring 136 may be disposed within central bore 134 of pole piece 122. In some embodiments, as depicted in FIGS. 49, 55, and 56, return spring 136 can be sized and captured within an enlarged portion of central bore 134, thereby eliminating the need for pre-loader 138. Return spring 136 can be held in a pre-loaded position (e.g. 0.8 lb preload) by virtue of being captured between a shoulder 135 of central bore 134 and an opposing bore 137 disposed in pintle head 132 (see FIGS. 55 and 56).

As depicted in FIGS. 21, 55, and 56, end portion 124 of pole piece 122 may be received within collar portion 126 of inner lower body 104 and thereby capturing pintle head 132 of pintle 118 therebetween such that pintle 118 extends along and within central bore 106 of inner lower body 104. Longitudinal central axis of pintle 118 may be coincident with a longitudinal central axis of central bore 106. Male portion 114 of orifice plate holder 112 may be joined or inserted within female portion 116 of inner lower body 104. Female portion 116 may be described as a cavity or bore. Conversely, as depicted in FIGS. 49, 55, and 56, portion 114 of orifice plate holder 112 can be sized larger than portion 116 of inner lower body 104, such that portion 114 of orifice plate holder 112 generally surrounds and captures portion 116 of inner lower body 104. In such arrangement, portion 116 can be termed the male portion and portion 114 can be termed the female portion. In some embodiments, inner lower body 104 can be electron beam welded or other permanent attachment method to orifice plate holder 112.

As depicted throughout and in particular FIG. 49, injector body upper section 102a of injector body 102 may be joined with injector body lower section 102b of injector body 102 such that orifice plate holder 112, inner lower body 104, pintle 118, pole piece 122, return spring 136 and optional spring pre-loader 138 are captured within a chamber 148 of injector body upper section 102a, and in some embodiments, a chamber 150 of injector body lower section 102b.

With reference to FIGS. 2A, 2B, 28-33, and 49, a disc-shaped bobbin 144 which by way of non-limiting example, may be made of Delrin or Polyoxymethylene (commonly referred to as POM and also known as polyacetal or poly-formaldehyde). POM is a thermoplastic that may be used in manufacturing precision parts that require high stiffness and excellent dimensional integrity. Continuing, bobbin 144 may have a central bore 146 and may be positioned and captured between injector body upper section 102a and injector body lower section 102b such that inner lower body 104 and pole piece 122 are received within central bore 146 of bobbin 144. Specifically, bobbin 144 can be received within correspondingly-sized depressions 148, 150 (FIGS. 2A, 2B, 22-24, and 49) formed in injector body upper section 102a and injector body lower section 102b, respectively of injector body 102. In some embodiments, injector body lower section 102b may comprise a lip 152 that can be rolled or formed over a shoulder 154 of injector body upper section 102a to retain injector body lower section 102b with injector body upper section 102a (FIGS. 2A-5, 49, and 56). In some embodiments, a seal member, such as an O-ring, can be provided within a seal depression 156 (FIG. 2B) defined within injector body upper section 102a so that the O-ring is situated between injector body upper section 102a and injector body lower section 102b to define and ensure a leak-proof fluid seal.

To affect the opening and closing of exit orifice 110, an actuator may be provided, for example in the form of magnetic coil 180 (FIGS. 28-30 and 49) mounted in injector body 102 and, in some embodiments, mounted and/or formed with bobbin 144. Magnetic coil 180 of the present teachings of the disclosure is substantially smaller compared to traditional coils used in reagent injectors. This smaller size provides several advantages over conventional coils, including less heat being generated during actuation that would otherwise need to be managed through active cooling, such as exterior air cooling, of the reagent injector. Thus, through the use of a smaller magnetic coil in the present disclosure, less heat is generated during coil operation and, consequently, less active cooling of the reagent injector is required. By way of non-limiting example, it has been found that magnetic coils having 100 turns of #29 magnet wire with a 10 mm ID and 17 mm OD and 3.8 mm axial length is sufficient to reliably actuate reagent injector 100, 101. Additionally, by way of non-limiting example, it has also been found that magnetic coils having 378 turns of 30GA wire is sufficient to reliably actuate reagent injector 101 of FIGS. 49-57.

When magnetic coil 180 is energized via electrical leads 182 (FIGS. 28 and 29), metering pintle 118 is drawn upward from the closed position to the open position. Upward is a direction that is away from an exhaust pipe to which injector 100, 101 may be mounted. Some members of the assembly, such as enlarged diameter end portion 124 of elongated pole piece 122 and/or pintle head 132, can be made of a magnetic material, such as 430 stainless steel, to help promote establishment of a magnetic field. Likewise, some members of the assembly, such as collar portion 126 of elongated inner lower body 104, may be made of a non-magnetic material to limit the effect on the metering pintle 118. Magnetic coil 180 may be energized, for example, in response to a signal from electronic injection controller 16 of FIG. 1, which decides based upon sensor input signals and its preprogrammed algorithms, when reagent is needed for effective selective catalytic reduction of NOx emissions in the exhaust stream within exhaust pipe to which injector 100, 101 is mounted.

To facilitate movement of pintle 118, pintle head 132 may be aligned with a flux frame of electromagnetic coil 180. For instance, as depicted in at least FIG. 42, flux frame, which surrounds bobbin 144 and electromagnetic coil 180, may align with pintle head 132. Thus, in cross-sectional view of FIG. 42, if a straight line is drawn between cross-sectional halves of flux frame, so as to connect flux frame, the straight line would be drawn through pintle head 132. Such arrangement enhances the electromagnetic effect of electromagnetic coil 180 on pintle head 132.

In some embodiments, electrical leads 182 provide a control signal to the reagent injector 100, 101, for example from the reagent electronic injection controller 16 (FIG. 1). Magnetic coil 180 may be energized by a 12-24 VDC current using a pulse width modulated digital signal. In some embodiments, the control signal may be a simple square wave. However, in some embodiments, it has been found that substantially improved performance and metering of reagent may be achieved through use of a control signal generally similar to that illustrated in FIG. 47. For comparison, with reference to FIG. 46, a conventional square wave is depicted having a starting impulse (a) at t=0 to a constant output (b) and terminating (c) to zero at t=1. This conventional square wave energizes a coil and produces a delayed response in an injector, that is, the injector initially opens according to a curved response (d) to a fully opened position and finally closes according to a delayed response (e).

Figure 47:
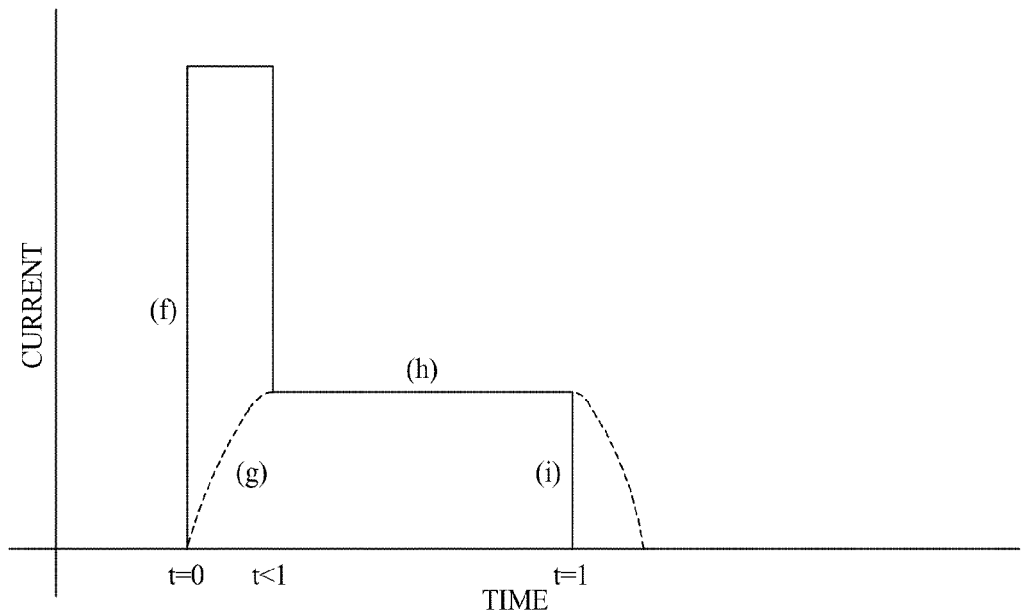
FIG. 47 is a graph showing a peak and hold control signal according to the present teachings.

According to teachings of the present disclosure, a control signal is provided in FIG. 47 having a starting impulse (f) at t=0 that defines an impulse greater than the constant output (b) of the conventional signal. The starting impulse (f) can extend for a time t<1 to urge a faster opening response (g) of reagent injector 100, 101. It should be appreciated that the opening response (g) of the refined control signal of the present teachings is quicker (and thus steeper in slope) than the opening response (d) of the conventional control signal. The control signal of the present teachings can then be reduced to a lower output (h) at t<1 and held until terminated (i) to zero at t=1. It has been found that by using the control signal of the present teachings, reagent injector 100, 101 is capable of minimizing a delay associated with moving from a closed position to an opened position and from the opened position back to the closed position, and thus is capable of achieving improved response and metering capability.

The combination of pulse width modulation providing a peak and hold response control, and mechanical atomization techniques, is appropriate for providing small quantities of atomized hydrocarbons with precise timing. Cooling aspects provided by the present teachings allow injector 100, 101 to survive in proximity to hot exhaust gases and prevent pre-ignition of the hydrocarbon.

Figure 6:
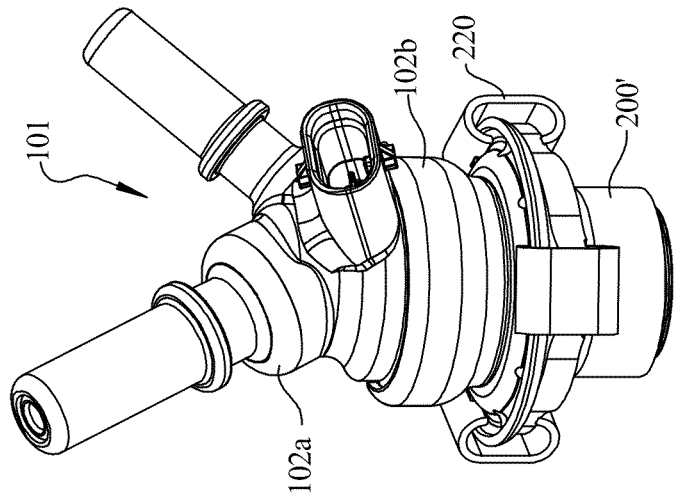
FIG. 6 depicts a top perspective view of a reagent injector according to some embodiments of the present teachings.
Figure 7:
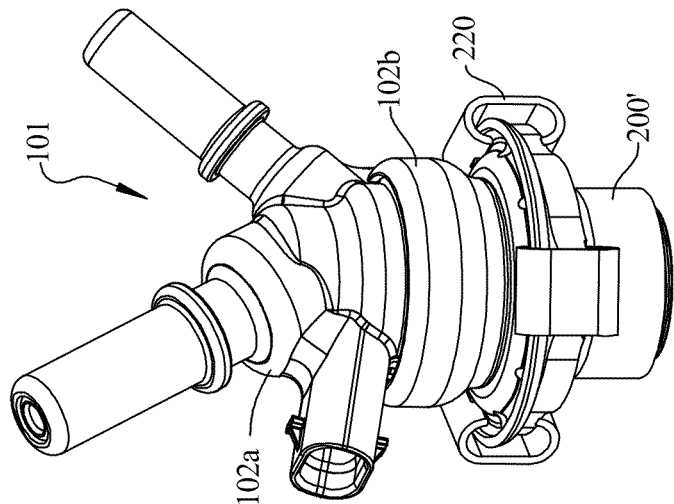
FIG. 7 depicts a top perspective view of a reagent injector according to some embodiments of the present teachings.
Figure 8:
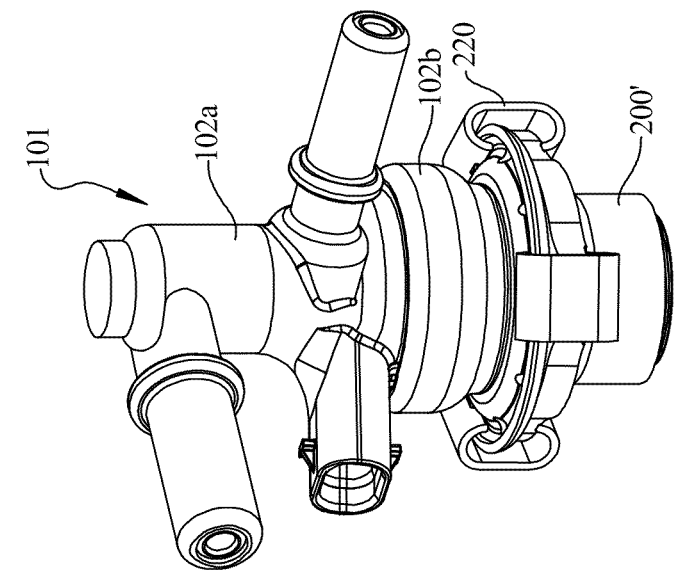
FIG. 8 depicts a top perspective view of a reagent injector according to some embodiments of the present teachings.
Figure 9:
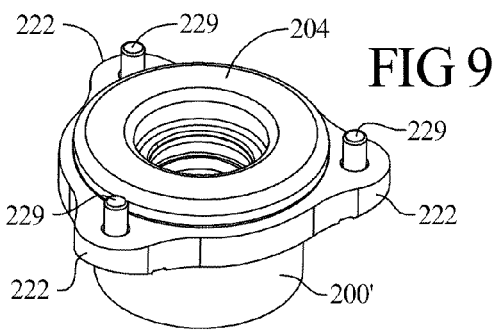
FIG. 9 depicts a top perspective view of an insulator and mounting flange of an injector mount according to the present teachings.

In some embodiments, as depicted in FIG. 2B, reagent injector 100, 101 may employ a fluid coupling 160 having a body 162 defining a chamber 164. FIGS. 43 and 44 depict perspective views of fluid coupling 160, which may be releasably coupled to injector body upper section 102a of injector body 102 to affect a fluid connection. To this end, chamber 164 of body 162 is recessed or concave as a female portion to engage and couple to a protruding or male portion 166 of injector body upper section 102a of injector body 102. With such a construction, a reliable and releasable connection is formed between fluid coupling 160 and the remainder of reagent injector 100, 101. Fluid coupling 160 includes a reagent inlet 168 and a reagent outlet 170 to supply aqueous reagent or urea to a fluid path within reagent injector 100, 101. It should be appreciated that in some embodiments fluid coupling 160 can comprise a plurality of separate lines connectable to a common hub, such as depicted in FIGS. 6-8.

According to teachings of the present disclosure, a fluid path is defined within reagent injector 100, 101 when pintle 118 is in the closed position to facilitate circulation of fluid through injector 100, 101. More specifically, and with reference to FIGS. 18, 42, and 49, the fluid path can extend from reagent inlet 168 to a distribution chamber 171 and subsequently to reagent outlet 170. In further detail, fluid or reagent may enter reagent injector 100, 101, 101 at reagent inlet 168 at a first temperature, which may be relatively cool. Fluid may then proceed by flowing along a pathway 300 along and against an exterior side of pole piece 122. Pathway 300 may be defined by an exterior surface of pole piece 122 and an inside diameter of chamber 148 of injector body upper section 102a. The fluid can then continue in its direction of flow and pass between an exterior surface of pole piece 122 and inside of bobbin 144. More specifically, fluid may continue in its direction of flow and pass through at least one slot or a plurality of slots 302 (see FIGS. 31-33 and 57) formed along the inner diameter of bobbin 144 and/or fluid sleeve 301. During this stage, the cool fluid is exposed to an exterior surface area of bobbin 144 and is operable to cool, or absorb a portion of thermal energy from, bobbin 144 and associated coil 180, which may transfer heat into bobbin 144.

Figure 31:
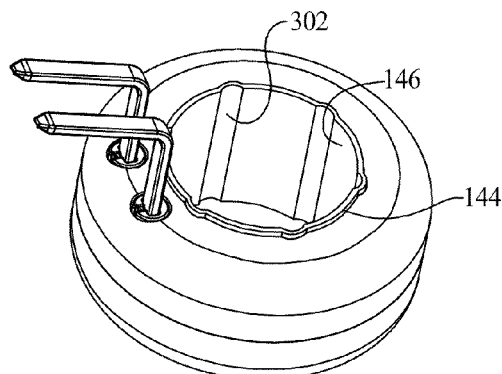
FIG. 31 depicts a top perspective view of the bobbin assembly according to the present teachings.
Figure 33:
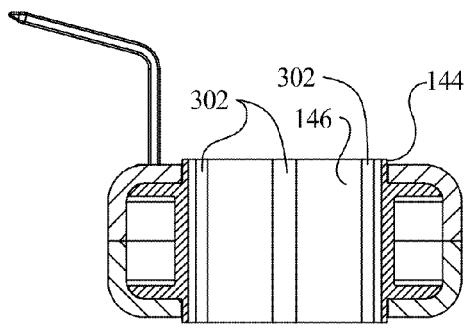
FIG. 33 depicts a cross-sectional view of the bobbin assembly according to the present teachings.
Figure 32:
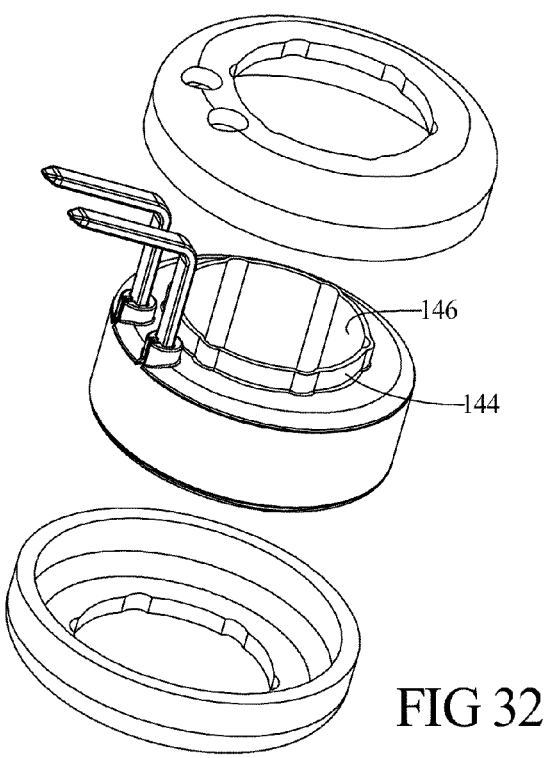
FIG. 32 depicts an exploded view of the bobbin assembly according to the present teachings.

Alternatively, a separate part, such as a fluid sleeve 301 (see FIGS. 49 and 57), may be incorporated within an inside diameter of bobbin 144, or more generally, within an inside diameter of electromagnetic coil 180, to separate the electromagnetic coil 180 from the fluid path. In utilizing a fluid sleeve 301, slots 302 may not be necessary, for instance, to permit passage of fluid or, in some embodiments, can be disposed within fluid sleeve 301 (see FIG. 57). With reference to FIGS. 31 and 33, although not particularly depicted, a fluid sleeve may have a generally smooth exterior adjacent to central bore 146, and a generally smooth interior. A height of such a fluid sleeve may be the same or generally the same as a height of bobbin 144 depicted in FIG. 33 and disposed within central bore 146 of solenoid coil bobbin 144 or can be larger than that of solenoid coil bobbin 144 (see FIG. 49). With reference to FIG. 57, in some embodiments, fluid sleeve 301 can comprise a pair of flux bridges 305 having a flux break 307 disposed therebetween. More particularly, in some embodiments, flux bridges 305 can be in mirrored arrangement and comprise a first end 309 being male-shaped that is sized to be received within complementary female-shaped ends 311 of flux break 307. As described, slots 302 can extend through flux bridges 305 to provide fluid communication. Flux bridges 305 can define internal surfaces 313 that can serve as guides for outer surface 126 of inner lower body 104 and flange 128 of pole piece 122 (see FIG. 49). In some embodiments, flux bridges 305 can be made of a magnetic material and flux break 307 can be made of non-magnetic material. O-rings 303 may be utilized between seals or component parts, such as between a fluid sleeve 301 and injector body upper section 102a and between fluid sleeve 301 and injector body lower section 102b.

The presence of cool fluid flowing adjacent bobbin 144 is beneficial to the operation and longevity of magnetic coil 180 because of the heat-absorbing function of the fluid. The fluid may then proceed in flowing from slots 302 to a lower body passage 304 along an exterior side or surface of inner lower body 104 (see FIGS. 18 and 49). More specifically, lower body passage 304 may be defined between an exterior side or surface of inner lower body 104 and an interior surface or surface of injector body lower section 102b of injector body 102, such as chamber 150 of injector body lower section 102b. In some embodiments, lower body passage 304 may completely surround part of or an entire length 306 of inner lower body 104 to cool inner lower body 104. Moreover, fluid within lower body passage 304 can further cool at least a portion of injector body lower section 102b of injector body 102. As depicted in FIGS. 18 and 49, fluid within lower body passage 304 can be directed to distribution chamber 171 via one or more distribution passages 308. Fluid within distribution chamber 171 can be directed to a swirl chamber 320 when pintle 118 is in an opened or closed position, while cooling orifice plate 108. One or more return passages 312 may extend from distribution chamber 171 to central bore 106 of inner lower body 104 and provide a fluid path for fluid from distribution chamber 171 to central bore 106 of inner lower body 104. Fluid within central bore 106 may provide cooling to pintle 118 and inner lower body 104. Upon flowing into central bore 106, fluid may flow from along an entire length of central bore 106 such that fluid surrounds an outside diameter of pintle 118, which may be a solid, non-hollow structure. Fluid may proceed in flowing along a length of pintle 118 within central bore 106 in a direction away from orifice plate 108 and exhaust stream of exhaust pipe. In some embodiments, at an end of central bore 106 that is opposite return passage 312, fluid may flow through exit slots or holes, which may be through exit slots or holes 109 in guide plate 107. Guide slot 109 may be solely defined by guide plate 107 and an exterior surface of pintle 118. Upon flowing through one of more guide slots or holes 109 in guide plate 107 or directly from central bore 106, fluid may flow through a passage 316 in pintle head 132, then to central bore 134 of pole piece 122, and subsequently to reagent outlet 170 and back to reagent tank 12. Passage 316 may be a through hole in pintle head 132. Moreover, in some embodiments as depicted in FIGS. 49, 55, and 56, passage 316 can be directed such that reagent flows to a central portion of spring 136 and central bore 134. More particularly, in some embodiments, pintle head 132 can be shaped to include a chamber 141 that is co-axial with central bore 134 so as to deliver reagent to the middle of spring 136 for effective cooling and improved fluid flow.

From the above discussion, it should be recognized that the flow of fluid into and out of injector 100, 101, even when injector 100, 101 is not injecting fluid into an exhaust stream, provides a cooling effect to reagent injector 100, 101. Moreover, it should be recognized that the flow velocity from reagent inlet 168 and through pathway 300, slots 302, and lower body passage 304 (generally collectively referred to as the cooling pathway) is less than the flow velocity exiting the reagent injector 100, 101 through central bore 106, passage 314, passage 316, central bore 134, and reagent outlet 170

(generally referred to as the heated pathway) because of the increased volume of the cooling pathway versus the reduced volume of the heated pathway. Therefore, this reduced flow velocity of the cooling pathway permits greater fluid presence in terms of fluid volume, longer fluid dwell time, and increased thermal absorption when the fluid is coolest. Likewise, the increased flow velocity of the heated pathway permits greater removal of heated fluid from reagent injector 100, 101. The overall effect is improved cooling and thermal management of reagent injector 100, 101.

Reagent injector may be in an opened position when pintle 118 is lifted or moved away from orifice plate 108 and fluid is permitted to flow toward and into an exhaust stream within exhaust pipe 19. Similar to the above description of fluid flow through injector 100, 101 when reagent injector 100, 101 is in a closed position, when reagent injector 100, 101 is in an opened position, a free-flowing and unobstructed fluid path extends from distribution chamber 171 to a swirl chamber 320 (FIG. 18) via one or more slots 322 in orifice plate 108 and out of orifice 110 and, for example, into an exhaust stream within exhaust pipe 19.

Slots 322 may be formed into orifice plate 108, as depicted in FIG. 16. Alternatively, an intermediate plate may have slots 322 formed into it. For example, orifice plate holder 112 depicted in FIGS. 2A-2B may have slots 322 formed into it. Still yet, slots 322 may be formed into a bottom surface of inner lower body 104. Thus, various options exist for forming slots to control reagent flow proximate exit orifice.

It should be recognized that fluid generally flows within swirl chamber 320 only when pintle 118 is in the raised and open position and unseated from valve seat 120. This arrangement substantially improves dosage of reagent from reagent injector 100, 101. That is, a dosage amount in conventional injectors can often vary based on flow velocity, spray angle, droplet size, and the like. When fluid flow is permitted to freely flow within a swirl chamber and that flow is varied by parameter settings of the system, such as return line backpressure, velocity, and the like, the dosage amount of ejected reagent can vary substantially. Therefore, according to the principles of the present teachings, these disadvantages can be avoided by, in part, using return passages 312 that return fluid to reagent outlet 170 without the need for the fluid to pass through swirl chamber 320. Instead, reagent may pass about a periphery of swirl chamber, a periphery of slots 322 and raised portions that define slots 322.

In other words, in some embodiments, reagent may be delivered to exit orifice 110 via reagent inlet 168. Reagent inlet 168 may be in fluid communication with exit orifice 110 and may be externally connected to reagent tank 12 via supply line 9. Reagent may be pumped to reagent injector 100, 101 at a predetermined pressure set point and into reagent inlet 168 and subsequently to exit orifice 110. The predetermined pressure set point may vary in response to operating conditions to provide at least one of increased operating range and varied spray patterns from exit orifice 110. The pressurized reagent may be accelerated to a relatively high velocity based on the construction and shape of orifice plate 108. This produces a high velocity flow in the exit orifice 110. When the end of pintle 118 is removed from valve seat 120, a portion of the flow of reagent is passed through exit orifice 110, where atomization occurs from a combination of centrifugal force and shearing of the reagent by air as it jets into the exhaust stream.

As an example, approximately 600 milliliters per minute (ml/min), which converts to 36 liters per hour (l/hr), of reagent may be circulated through reagent injector 100, 101, which may be greater than an amount of reagent actually dispensed from exit orifice 110. Although the flow rate may be varied depending on the specific exhaust treatment application, reagent not dispensed into an exhaust stream via exit orifice 110, exits reagent injector 100, 101 via reagent outlet 170 and is returned to reagent tank 12 for circulation. Upon removing the end of metering pintle 118 from valve seat 120, atomized reagent may be expelled at the rate of approximately 1 ml/min (0.06 l/hr) to 600 ml/min (36 l/hr) depending on the exhaust treatment application and/or the control algorithm used. The spray characteristics of reagent expelled from exit orifice 110 may be varied depending on the pressure ratios of the pressure maintained in the return line 35 to reagent tank 12 from reagent injector 100, 101 and in supply line 24 to reagent injector from delivery module 14. For example, the size of the droplets may be controlled by varying the pressure in the supply line 24. In addition, the spray characteristics may be varied by interchanging different spray plates or orifice plates. Varying the reagent circulation rate, such as by changing an output pressure by delivery module 14, can change the level of cooling provided by the reagent, but will no longer have an effect on the droplet size or spray cone angle.

As depicted in FIGS. 2A and 2B, metering pintle 118 may be biased in the closed position by a biasing member, which may be, for example, in the form of return spring 136 that engages pintle head 132 of pintle 118. Return spring 136 may engage a top surface of pintle head 132 of pintle 118. A top surface of pintle head 132 may be a surface of plunger opposite pintle 118. Top surface may be curved or convex, or include bore 137 (FIG. 55).

Figure 42:
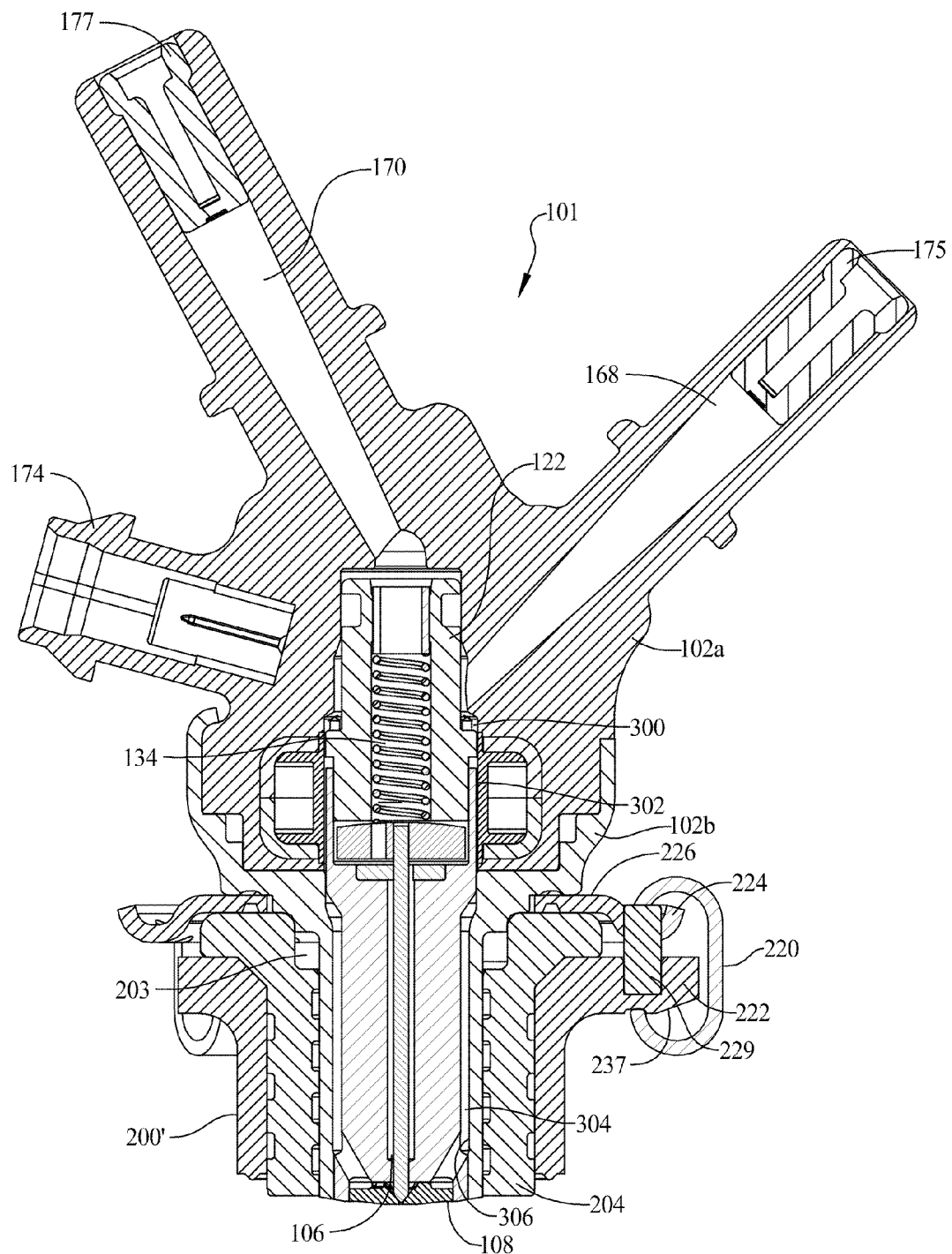
FIG. 42 depicts a cross-sectional view of the reagent injector according to the present teachings.
Figure 46:
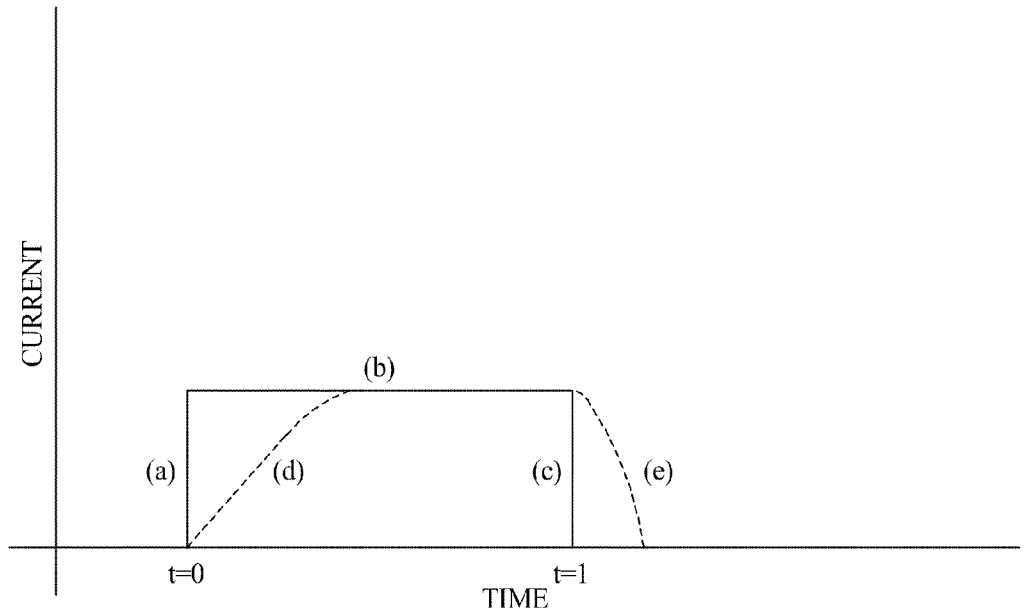
FIG. 46 is a graph showing a conventional control signal.

With particular reference to FIGS. 4, 5 and 43-45, external perspective views of reagent injector 100, 101 depict connection to an exhaust tube 19. In some embodiments, connection of reagent injector 100, 101 to exhaust tube 19 can be achieved in such a way as to minimize the disadvantages of forces, such as torque and the like, that can be exerted upon reagent injector 100, 101. That is, in some embodiments as illustrated in FIGS. 2A, 2B, and 9-11, a mounting flange 200 can be coupled to exhaust tube 19 via a weld, threaded fastener, or other conventional means. Mounting flange 200 may be formed having a central bore 202 sized to receive injector body lower section 102b of injector body 102 to permit exit orifice 110 to be positioned in a predetermined position within exhaust tube 19 to introduce reagent inside of exhaust tube 19 at a desired orientation. In some embodiments, as depicted in FIGS. 2A, 2B, and 9-11, an insulator 204 may be disposed between mounted flange 200 and injector body lower section 102b of injector body 102 to minimize the transfer of thermal energy from exhaust system 18, and more specifically, from exhaust gases and exhaust tube 19, to reagent injector 100, 101. To further resist passage of exhaust gases, an appropriate heat-resistant O-ring 203 may be installed at an elbow or shoulder location between insulator 204 and mounting flange 200' as depicted in FIG. 42.

Insulator 204 may be made of a material having thermal properties that minimize heat transfer, such as Makor or Pressed Mullite. Insulator 204 may comprise a tubular section 206 having an outer diameter and/or shape complementary to an inner diameter and/or shape of central bore 202 of mounting flange 200 to permit insulator 204 to be received within mounting flange 200. Moreover, an outer diameter of tubular section 206 may contact an inner diameter of central bore 202 of mounting flange 200. Similarly, tubular section 206 may comprise an inner diameter and/or shape complementary to an outer diameter and/or shape of injector body lower section 102b to permit injector body lower section 102b of injector body 102 to be received within insulator 204. Moreover, an outer diameter and/or shape of injector body lower section 102b may contact an inner diameter of insulator 204. Insulator 204 may have an outside diameter that has a series of alternating protrusions and recessions that limit contact of an outside diameter of tubular section 206 to the protruding portions and not the recession portions. With this construction, outside diameter of tubular section 206 has less contact with an inside diameter of mounting flange 200 and thus, less heat transfer between tubular section 206 and mounting flange 200 will take place than if alternating protrusions and recessions were a smooth surface or part of a threaded contact surface.

Similarly, tubular section 206 may comprise an inner diameter that has a series of alternating protrusions and recessions that limit contact of an inside diameter of tubular section 206 with an outer diameter of injector body lower section 102b to the protruding portions and not the recession portions. With this construction, inside diameter of tubular section 206 has less contact with an outside diameter of injector body lower section 102b and thus, less heat transfer between tubular section 206 and injector body lower section 102b will take place than if alternating protrusions and recessions were a smooth surface or part of a threaded contact surface.

Insulator 204 has proven to provide substantial thermal insulating properties conducive to minimizing heat conduction from exhaust system 18 to reagent injector 100, 101. Specifically, by way of non-limiting example, it has been found that temperatures external to insulator 204 can range from 500° C. and higher. However, interior wall temperatures of bore 202 of insulator 204 do not typically exceed 70-100° C. In some embodiments, insulator 204 is metalized and Nickel brazed to the external metal housing or mounting flange 200, 200'. The braze serves to provide a gas tight seal without resorting to any form of gasket or other sealing device, and to provide retention of the insulator within the flange 200. The braze joint has thermal capabilities that are higher than temperatures that are expected to occur in service with the injector 100, 101, mounting flange 200 and insulator 204 when installed as part of an exhaust system, thus ensuring an acceptable margin of safety for reliable sealing and attachment.

With continued reference to FIGS. 2A and 2B, injector body lower section 102b of injector body 102 may be fastened to mounting flange 200 via a plurality of fasteners 208, such as cap screws. Fasteners 208 can extend through respective apertures 210 formed in a flange ring 212 of injector body lower section 102b and be threadingly engaged with a corresponding aperture 214 formed in a flange ring 216 of mounting flange 200. In some embodiments, a lip 205, which may be circular, of insulator 204 may be positioned between injector body lower section 102b and mounting flange 200 to reliably retain, or sandwich by contact, insulator 204 therein. Insulator 204 can be used as a pilot for projection welding mounting flange 200 to the exhaust pipe.

Figure 22:
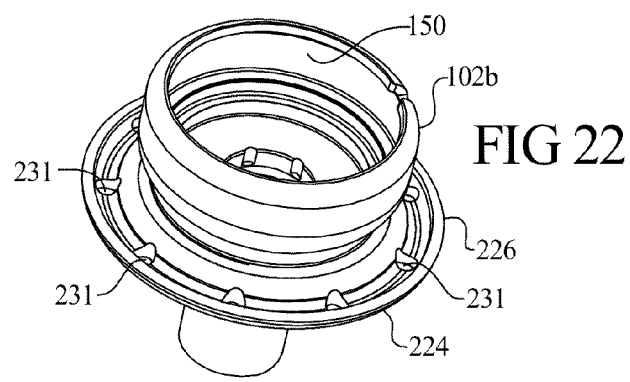
FIG. 22 depicts a top perspective view of the lower section of the injector body and retaining plate according to the present teachings.
Figure 24:
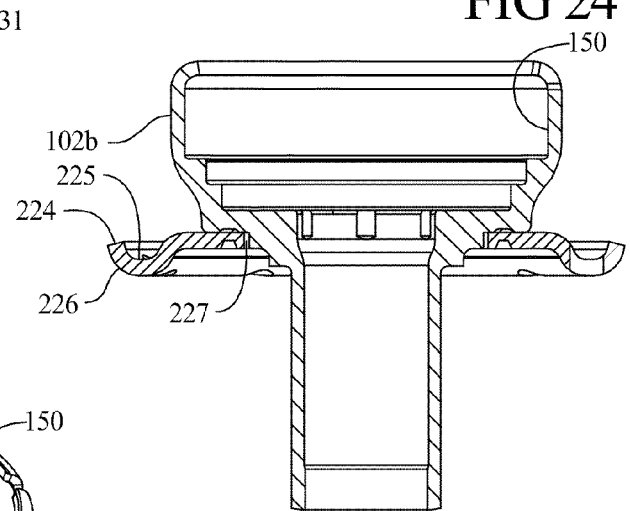
FIG. 24 depicts a cross-sectional view of the lower section of the injector body and retaining plate according to the present teachings.
Figure 23:
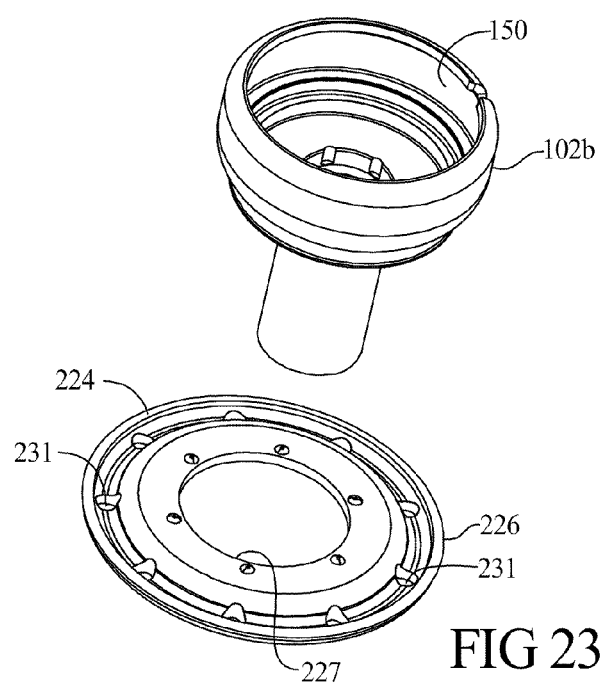
FIG. 23 depicts an exploded view of the lower section of the injector body and retaining plate according to the present teachings.
Figure 25:
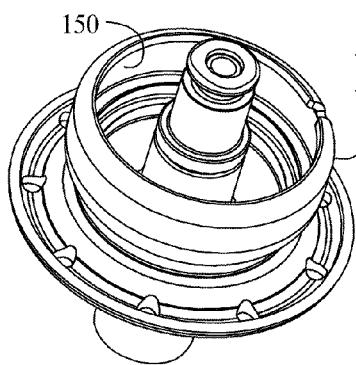
FIG. 25 depicts a top perspective view of the lower section of the injector body and inner lower body according to the present teachings.
Figure 27:
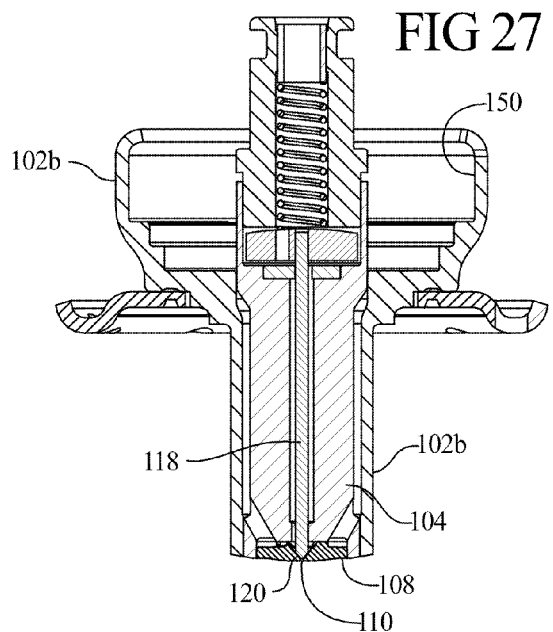
FIG. 27 depicts a cross-sectional view of the lower section of the injector body and inner lower body according to the present teachings.
Figure 26:
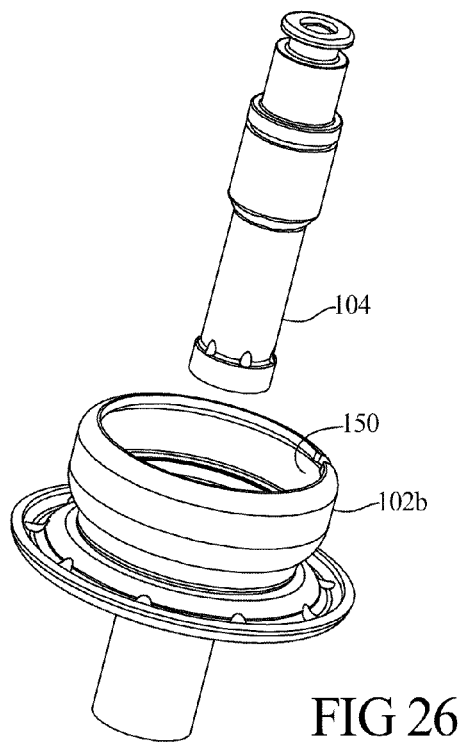
FIG. 26 depicts an exploded view of the lower section of the injector body and inner lower body according to the present teachings.
Figure 41:
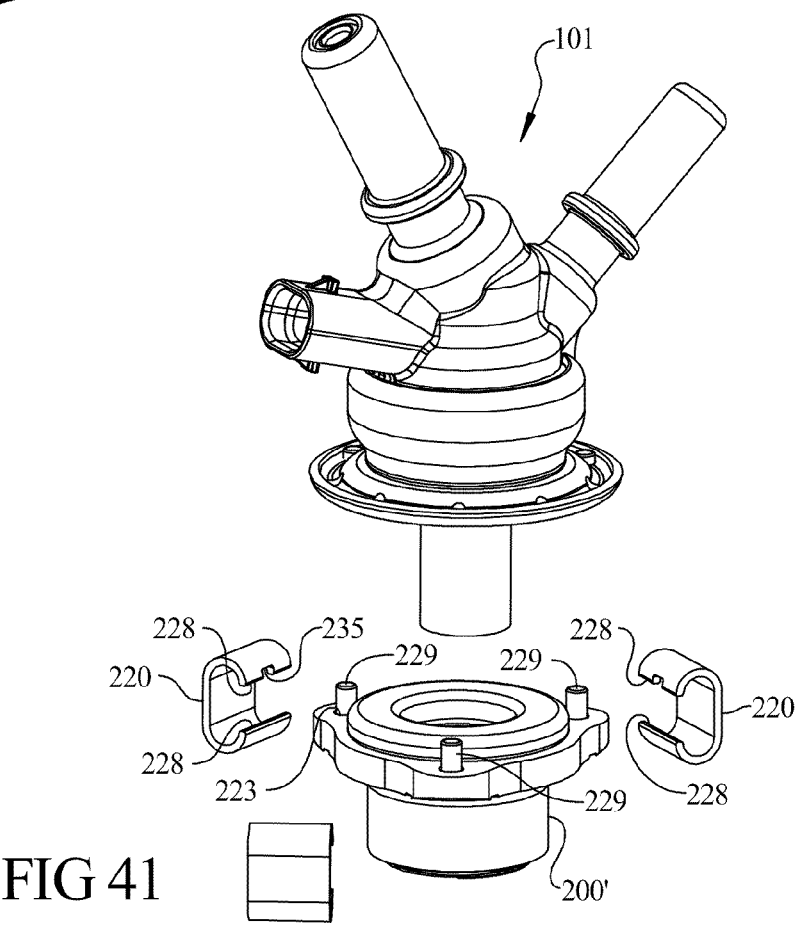
FIG. 41 depicts an exploded view of the reagent injector according to the present teachings.

In some embodiments, however, as seen in FIGS. 4-8 and 41-42, injector body lower section 102b of injector body 102 may be fastened to mounting flange 200' via a plurality of clips 220, which in cross-section may be C-shaped or oval. Alternatively, clips 220 may be formed in other shapes. For instance, clips 220 may be circular, square or rectangular in cross-section. Clips 220 may be used to overlap or cover a portion of a peripheral ring section 222 of mounting flange 200' and a peripheral ring section 224 of a retaining plate 226 (FIG. 41-42). As depicted in FIGS. 22-24, retaining plate 226 may be a disc-shaped member having upturned peripheral ring section 224 and a central aperture 227 for receiving injector body lower section 102b of injector body 102. Retaining plate 226 may be coupled to injector body lower section 102b of injector body 102 via press-fit and brazing or welding to retain injector body 102 therewith. Each of clips 220 may comprise terminal ends 228 (FIG. 41) that generally face or oppose each other and exert a clamping force on mounting flange 200' and retaining plate 226 to couple injector body 102 to mounting flange 200'. More specifically, with reference continuing with FIGS. 41-42, a first terminal end 228 of a clip 220 may contact ring section 222 of mounting flange 200' and a second terminal end 228 of clip 220 may contact peripheral ring section 224 of retaining plate 226 of injector body lower section 102b of injector body 102. Second terminal end 228 of clip 220 may further reside within and contact a peripheral concavity 225 of peripheral ring section 224 of retaining plate 226. Concavity 225 may prevent movement of clip toward and away from a central vertical axis of reagent injector 100, 101. Central vertical axis of reagent injector 100, 101 may be coincident with a longitudinal axis of pintle 118. By preventing movement of clip 220 toward and away from a central vertical axis of reagent injector 100, 101, clip 220 remains in its installation position.

To prevent or minimize rotation of injector body lower section 102b relative to injector body upper section 102a of injector body 102, and further prevent movement of installed clips 220 relative to retaining plate 226 and mounting flange 200', locating pins 229 (FIGS. 9-11 and 41-42) may extend upward from retention holes 223 or slots in mounting flange 200' and may be received within any one of a number of locating holes 231, which may be through holes, formed in retaining plate 226 (FIGS. 22-23). Locating pins 229 and locating holes 231 engage one another and form a connection therebetween that prevents relative rotation of clips 220, retaining plate 226 and mounting flange 200'. Thus, the present disclosure provides an injector and mount interface that permits a selection of rotational orientations for desired injector installation, thereby avoiding the need for application specific mounts and components.

Figure 11:
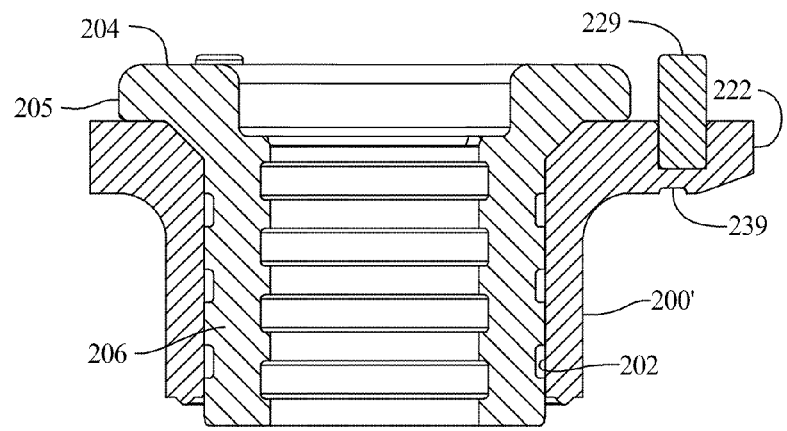
FIG. 11 depicts a cross-sectional view of the insulator and mounting flange of FIGS. 9 and 10 according to the present teachings.
Figure 10:
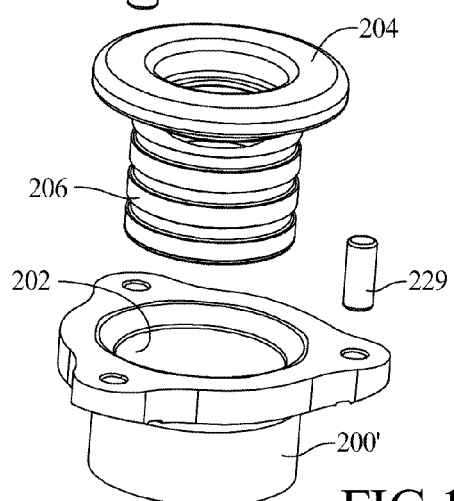
FIG. 10 depicts an exploded view of an insulator and mounting flange of an injector mount according to the present teachings.

With reference including FIGS. 41 and 42, clip 220 may have a notch 235 on one of opposing terminal ends 228. For instance, notch 235 may be on a side of reagent injector 100, 101 that is referred to as a top side. A top side of reagent injector 100, 101 may be that side of retaining plate 226 that faces away from exhaust tube 19 when reagent injector 100, 101 is installed on an exhaust tube 19. Notch 235 may be wider than a diameter of locating pins 229 so that notch 235 of clip 220 may reside over an end of locating pin 220 as depicted in FIG. 42. During an installation of clip 220 to firmly secure retaining plate 226 and peripheral ring section 222 of mounting flange 200' together, and prevent relative movement between retaining plate 226 and peripheral ring section 222, second terminal end 228 of clip 220 with notch 235 may first be positioned over an end of locating pin 229, which is installed in blind hole of peripheral ring section 222. A portion of clip 220 on either side of notch 235 may contact a surface of peripheral ring section 224 and clip 220 may also contact locating pin 229. Subsequently, first terminal end 228 of clip 220 may be pressed around a periphery of contact ring section 222 of mounting flange 200' such that first terminal end 228 contacts a bevel portion 237 of contact ring section 222 before first terminal end 228 of clip 220 comes to rest in groove 239 (FIG. 11). Thus, second terminal end 228 of clip 220 is secured within concavity 225 of peripheral ring section 224 with locating pin 229 residing within notch 235, and first terminal end 228 of clip 220 is secured within groove 239 of peripheral ring section 222. Thus, upon installation of clip 220, a longitudinal axis of locating pin 229 may pass through each terminal end 228 of clip 220.

In some embodiments, insulator 204 can be positioned between injector body lower section 102b/retaining plate 226 and mounting flange 200' to reliably retain insulator 204 therein. It should be appreciated that clips 220 provide an advantage over traditional torque-based, twisting fasteners in that clips 220 do not exert any twisting or turning force (i.e. torque) on reagent injector 100, 101. Such twisting or turning forces have been found to damage reagent injectors and/or insulator 204 in some applications or if improperly installed (e.g. over-torqued) by a technician. Moreover, clips 220 provide a minimal thermal pathway for the conduction of heat from mounting flange 200' to injector body 102, thereby reducing and limiting the thermal load of reagent injector 100, 101 that must be dissipated.

In some embodiments, pintle 118, orifice plate holder 112, inner lower body 104, pole piece 122, spring pre-loader 138, injector body upper section 102a of injector body 102, mounting flange 200, 200', and/or fluid coupling 160 may be made of type 430C, 440F or similar stainless steel, and in some embodiments coated with a coating that retains urea corrosion resistance and magnetic properties while reducing metal fatigue caused over the life of reagent injector 100, 101. Collar section 126 and return spring 136 may be made of type 316 or similar stainless steel and, in some embodiments, coated with a coating that retains urea corrosion resistance while reducing metal fatigue caused over the life of reagent injector 100, 101.

FIGS. 43-45 depicts reagent injector 100, 101, which may employ a heat shield 340 to shield injector 100, 101 from radiant heat from exhaust tube 19. More specifically, heat shield 340 may be mounted to reagent injector 100, 101 using a single aperture through a heat shield surface 342 that is parallel to exhaust tube 19. FIG. 44 depicts a cover 344 that may be positioned over and around reagent injector 100, 101 to protect reagent injector from environmental elements such as water, snow, road debris, etc. Moreover, cover 344 may be an insulating cover and insulate reagent injector 100, 101, inside of cover 344, from the environment located outside of cover 344. For instance, cover 344 may hold heat generated by reagent injector 100, 101 within the confines or interior or cover 344, when the temperature outside of, or surrounding an exterior of, cover 344 is lower than the temperature within the confines of cover 344, where reagent injector 100, 101 is located. Similarly, cover 344 may prevent heated air located outside of cover 344 from elevating reagent injector 100, 101 to a temperature that hastens solidification or crystallization of reagent, such as urea for example, within reagent injector 100, 101. Cover 344 may be made of a plastic or metal material, similar to that from which reagent injector 100, 101 is manufactured. Cover 344 may have a through hole 346 through which inlet tube 348 and outlet tube 350 may pass. Electrical wires 352, 354 may also pass through hole 346. Cover 344 may secure onto heat shield 340 in a press fit, snap fit or other fashion to ensure that cover 344 remains securely attached to heat shield 340 when reagent injector 100, 101 with heat shield 340 is in use on an exhaust system, which may be employed on a vehicle.

Figure 48:
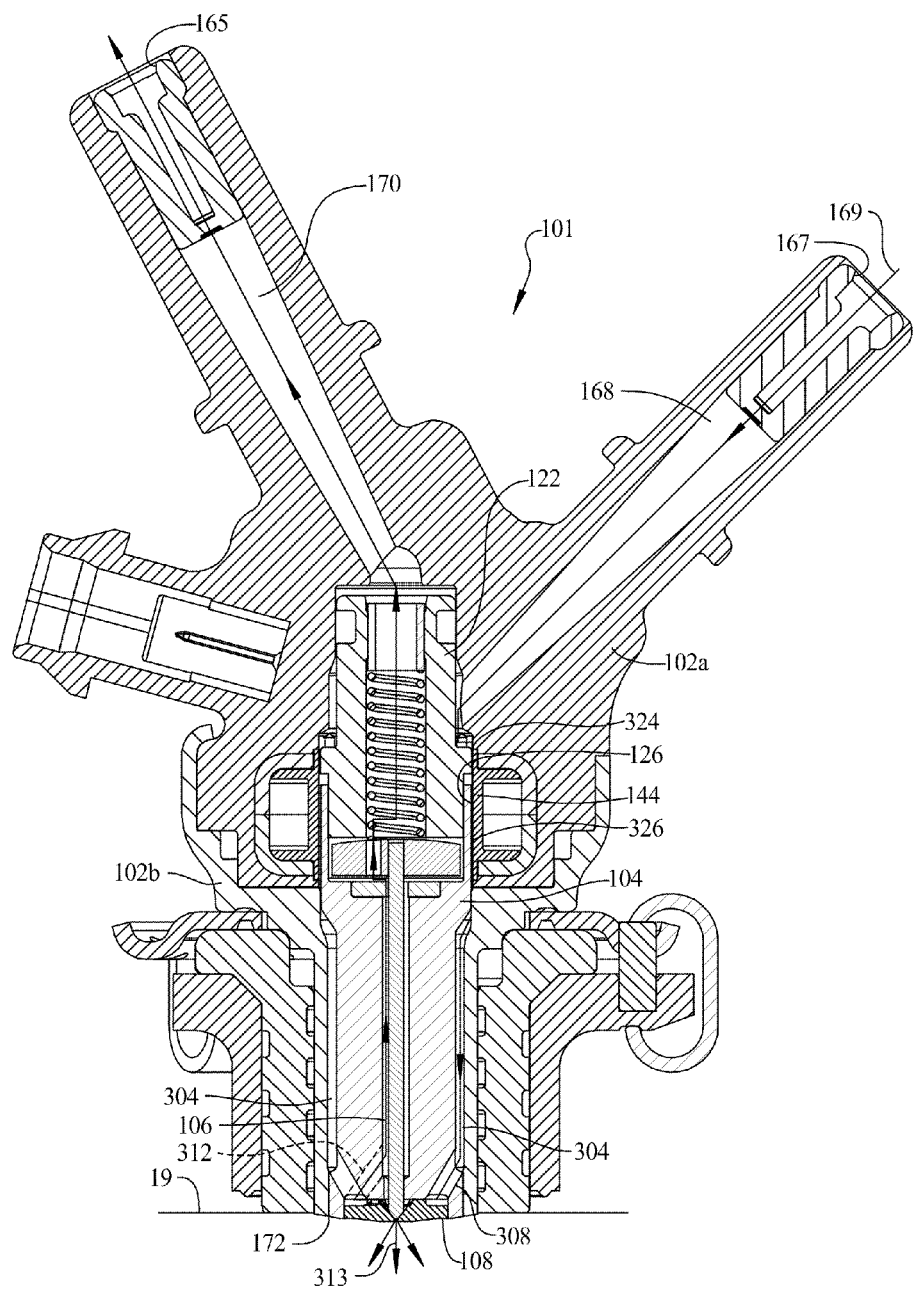
FIG. 48 depicts a cross-sectional view of the reagent injector illustrating fluid flow paths through the injector according to the present teachings.

A method of injecting a reagent into a gas stream is also provided in accordance with the present teachings. FIG. 48 depicts a cross-sectional view of an example reagent flow path 169 through reagent injector 101. As depicted, liquid reagent, such as urea, enters reagent injector 101 at inlet port 167, passes through inlet 168 and flows between an outside diameter of pole piece 122 and central bore 146 of solenoid coil bobbin 144. Because pole piece 122 and solenoid coil bobbin 144 have relatively large surface areas within reagent injector 101, liquid reagent may absorb heat from these components as reagent flows through reagent injector 101. Thus, the reagent flowing in accordance with reagent flow path 169 may become increasingly warmer as the reagent flows through reagent injector 101. Continuing, reagent proceeds to flow between an outer diameter of collar portion 126 and an inside diameter or central bore 146 of solenoid coil bobbin 144. Reagent then proceeds to flow through lower body passage 304, which is defined between an outside diameter of inner lower body 104 and an inside diameter of injector body lower section 102b. Reagent then reaches a location 172 where inner lower body 104 of reagent injector 101 has been welded to injector body lower section 102b of reagent injector 101. At this location, reagent flows from lower body passage 304 and into distribution passages 308 of inner lower body 104 that allow the reagent to flow into distribution chamber 171, formed between inner lower body 104 and orifice plate 108. If reagent injector 101 is closed, such as when solenoid is not powered or energized and tip of pintle 118 is seated against and forms a seal with valve seat 120, which may be a conical surface, of orifice plate 108, fluid is prevented from being sprayed into exhaust tube 19 from exit orifice 110.

With magnetic coil 180 not energized and pintle 118 seated against orifice plate 108, reagent travels at least part-way around distribution chamber 171 and flows into drillings or holes that connect distribution chamber 171 to central bore 106, which is the central bore of inner lower body 104. This central bore 106 or bore forms a return passage for the re-circulating reagent that removes heat generated between moving and contacting parts within reagent injector 101. Reagent injector 101 may be continuously cooled by circulating reagent even if reagent injector 101 is not actively injecting fluid into an exhaust stream of exhaust tube 19. If magnetic coil 180 of solenoid is electrically energized causing pintle 118 to be lifted off of and away from orifice plate 108, a portion of reagent will flow through slots 322, which may be tangential slots or curved slots, and subsequently into swirl chamber 320, which is located between tangential slots 322 and exit orifice 110, as depicted in FIG. 16. Only the volume of reagent injected into exhaust tube 19 as spray 313 flows through slots 322. In some embodiments, slots 322 may be part of interior face on inner lower body 108 (FIG. 18) or orifice plate holder 112 (FIG. 49, 55). In such arrangements, the orifice plate 108 would contain the swirl chamber 320 and exit orifice 110. It should be recognized that portions of each can be incorporated into the other without departing from the present teachings.

Continuing with FIG. 48, reagent that is directed into central bore 106 around pintle 118, flows from pathway 322 around a periphery of slots 322 and into passage 312, which directly leads into central bore 106. Upon flowing along a length of central bore 106, reagent may then flow through one or more through slots or holes 109 in guide plate 107. Pintle 118 forms a portion of a boundary of each of slots or holes 109 when pintle is inserted into center through hole of guide plate 107, as evident from FIGS. 17-18. After reagent passes through guide plate 107, reagent proceeds and passes through one of more through holes 316 in pintle head 132 and proceeds into and through central bore 134, which is where spring 136 and spring pre-loader 138 resides. Next, reagent flows into reagent outlet 170 and from reagent port 173.

Because only the volume of reagent injected flows through slots 322, a same or similar amount of reagent may be discharged from exit orifice 110, even if the volume of return flow through reagent outlet 170 were to vary by +/−30%. The desensitization of discharged flow vs. return flow volume permits a simple drilled restrictor orifice to be used for control of return flow and since no critical matching of injector orifice to return flow is needed, it is not necessary to incorporate the restrictor orifice in the injector itself. For water based media, including aqueous Urea, where freezing of the media is possible in cold weather conditions, the restrictor orifice is best positioned at the inlet of the return flow into the tank, since this results in only air being drawn through the orifice when the lines are purged of fluid after engine shutdown. This permits a faster purge cycle, which may also achieve the removal of a greater percentage of the fluid in the lines, resulting in a faster thaw cycle on startup.

When reagent injector 101 is undergoing "alternate return flow," only a portion of reagent exits through orifice plate 108 as spray 313 and into an exhaust stream of exhaust tube 19. The balance of reagent is returned to reagent tank 12 and re-circulated. In one example, reagent injector 101 may receive 30 liters per hour (l/hr) of reagent through reagent inlet 168 when reagent injector 101 is injecting reagent into exhaust tube 19. However, only 5 l/hr may actually exit through exit orifice and into an exhaust stream in exhaust tube 19. The balance of 25 l/hr may be returned through reagent injector 101 and exit reagent injector 101 at exit port 165 as return flow.

With reference mainly to FIGS. 18 and 48, in some embodiments, a method of directing reagent through injector 101 may include receiving a reagent from reagent tank 12 at reagent inlet 168 of reagent injector 101; directing the reagent to a pole piece passage 324 defined between an outside diameter of pole piece 122 and injector body upper section 102a and an inside diameter of electromagnetic bobbin 144; directing the reagent from the pole piece passage 324 to a collar passage 326 defined between an outside diameter of collar 126 of an inner lower body 104 and inside diameter of bobbin 144; directing the reagent from the collar passage 326 to a lower body passage 304 defined between an outside diameter of inner lower body 104 and an inside diameter of injector body lower section 102b of injector 101; and directing the reagent into a distribution passage 308 defined by inner lower body 104. Distribution passage 308 may fluidly link lower body passage 304 to distribution chamber 171 defined by inner lower body 104 and orifice plate 108. In some embodiments, from distribution chamber 171, the method may include directing a first partial volume of the reagent to exit orifice 110 in orifice plate 108 and directing a second partial volume of the reagent to a reagent outlet 170 of injector 101.

In some embodiments, directing a first partial volume of the reagent to exit orifice 110 in orifice plate 108 may include: directing the first partial volume of the reagent through plurality of slots 322 in orifice plate 108; moving a pintle 118 and unblocking orifice 110 in orifice plate 108; directing the first partial volume of the reagent through a plurality of slots 322 in orifice plate 108 and through orifice 110; and directing the first partial volume of the reagent to a central bore or central bore 106 defined by inner lower body 104.

In some embodiments, directing a second partial volume of the reagent to reagent outlet 170 or outlet port 165 may include: directing the second partial volume of the reagent through through slots or holes 109 (FIG. 17) defined in guide plate 107 through which pintle 118 passes; directing the second partial volume of the reagent through through holes 316 of pintle head 132, pintle head 132 attaching to and surrounding an end of pintle 118; directing the second partial volume of the reagent through an interior of bobbin 144 of magnetic coil 180; directing the second partial volume of the reagent through central bore 134 of pole piece 122; directing the second partial volume of the reagent from distribution chamber 171 to at least one return passage 312 defined by inner lower body 104. Return passage 312 fluidly links distribution chamber 171 and central bore 134 defined by the inner lower body 104. Directing the second partial volume of the reagent around an outside diameter of solid pintle 118 residing within central bore 106 defined by the inner lower body 104.

Alternatively, in some embodiments, a method of directing reagent through an injector may entail pumping a reagent from reagent tank 12 to injector reagent inlet 168; directing the reagent to pole piece passage 324 defined between an outside diameter of pole piece 122 and injector body upper section 102a; directing the reagent from the pole piece passage 324 to a collar passage 326 located between an outside diameter of a collar 126 of inner lower body 104 and an inside diameter of the electromagnetic coil bobbin 144; directing the reagent from collar passage 326 to lower body passage 304 located between an outside diameter of inner lower body 104 and an inside diameter of injector body lower section 102b of injector 101; directing the reagent into a distribution passage 308 defined by inner lower body 104, distribution passage 308 fluidly linking lower body passage 304 and distribution chamber 171 defined by inner lower body 104 and orifice plate 108; dividing the reagent into a first partial volume and a second partial volume; directing the first partial volume and second partial volume of the reagent in the distribution chamber 171; directing the first partial volume into curved slots 322 defined in the orifice plate; lifting pintle 118 from orifice plate 108; and directing the first partial volume of the reagent around an orifice 110 in the orifice plate 108.

In some embodiments, a method may further entail directing the first partial volume of the reagent from around orifice 110 in orifice plate 108 and into exhaust tube 19 (FIG. 44) and directing the second partial volume of the reagent from reagent outlet 170 and outlet port 165 and to reagent tank 12.

Directing the second partial volume of the reagent to reagent outlet 170 may further entail: directing the second partial volume of the reagent to return passage 312 defined in inner lower body 104, return passage 312 directing the second partial volume from distribution chamber 171 to central bore 106 defined by inner lower body 104; directing the second partial volume around an outside diameter of solid pintle 118 residing within central bore 106; directing the second partial volume of the reagent through through slots or holes 109 of guide plate 107 through which solid pintle 118 passes; and directing the second partial volume of the reagent through through slots or holes 109 of pintle head 132 to which pintle 118 is attached; directing the second partial volume of the reagent through inside diameter of the electromagnetic coil bobbin 144; directing the second partial volume of the reagent through central longitudinal bore of pole piece 122. Pole piece 122 may be located through inside diameter of the electromagnetic coil bobbin 144. A partial volume of the reagent may be directed through a spring 136 residing within central longitudinal bore of pole piece 122.

In some embodiments, injector 101 for injecting reagent may employ injector body upper section 102a, injector body lower section 102b that may be secured to injector body upper section 102a, retaining plate 226 defining circular hole 227 (FIG. 24) such that retaining plate 226 may be secured around injector body lower section 102b via circular hole 227, insulator 204 defining a circular hole or central aperture such that insulator 204 may be secured around injector body lower section 102b, and mounting flange 200' defining a circular hole such that mounting flange 200' may be secured around insulator 204. Retaining plate 226 may be secured directly against injector body lower section 102b. Insulator 204 may be secured directly against injector body lower section 102b and retaining plate 226. Mounting flange 200' may be secured directly against insulator 204. Retaining plate 226 may define a plurality of through holes 231 about retaining plate peripheral portion 224 or peripheral ring portion 224, and mounting flange 200' may define a plurality of blind holes 223 about a mounting flange peripheral edge. Pin 229 having a first pin end and a second pin end may be employed such that the first pin end resides within one of blind holes 223 of mounting flange 200' and pin 229 resides completely through one of the plurality of through holes 231 of the retaining plate 226.

In some embodiments, clip 220 having a first clip end 228 and a second clip end 228 may be utilized in such a fashion that clip 220 may be secured over retaining plate peripheral portion 224 and mounting flange peripheral edge or ring section 222. Retaining plate peripheral portion 224 may define a peripheral concavity 225 and plurality of through holes 231 of retaining plate 226 may be located within peripheral concavity 225. Mounting flange peripheral edge may define a groove 239 (FIG. 11). First clip end 228 may reside within groove 239 of mounting flange peripheral ring section 222 and the second clip end 228 may reside within peripheral concavity 225 of retaining plate peripheral portion 224. Clip 220 may be C-shaped and second clip end 228 may reside on the second pin end (FIG. 42). Insulator 204 may define a tubular section with an inside diameter and an outside diameter that each have a series of alternating protrusions and recessions (FIG. 11).

In some embodiments, heat shield 340 may be installed on mounting flange 200' using a through hole in the heat shield such that mounting flange 200' may protrude through the through hole of the heat shield 340. In some embodiments, heat shield 340 may be positioned between an injector body upper section 102a and exhaust pipe 19 (FIG. 44). Cover 344 may be mounted to heat shield 340 such that cover 344 surrounds injector body upper section 102a, injector body lower section 102b, and mounting flange 200'.

In some embodiments, an injector for injecting reagent may employ cylindrical pole piece 122 defining a pole piece first end and a pole piece second end (FIG. 21). Pole piece 122 may have a hollow interior from the pole piece first end to the pole piece second end. Spring pre-loader 138 may be located within hollow central bore 134 and against a portion of the first end. Spring 136 may be located within central bore 134 and abut spring pre-loader 138. Electromagnetic coil 180 may be secured around bobbin 144 and electromagnetic coil 180 may itself surround an outside diameter of the cylindrical pole piece 122. In some embodiments, cylindrical pole piece 122, spring pre-loader 138, spring 136 and electromagnetic coil 180 reside only within a cavity or chamber of injector body upper section 102a.

A cylindrical inner lower body 104 may reside within a injector body lower section 102b and define a longitudinal central bore 106. An inner lower body first end may define a first end first bore with a diameter larger than a diameter of the longitudinal central bore. The inner lower body first end may also define a first end second bore with a diameter larger than the longitudinal central bore and larger than the first end first bore. An inner lower body second end may define a second end bore with a diameter larger than the longitudinal central bore. Injector 101 may further employ solid pintle 118 residing within longitudinal central bore 106. Guide plate 107 may be attached to intermediate portion of pintle 118. Guide plate 107 may reside within the first end first bore. Pintle head 132 may surround an end of the pintle 118, or part of the end of pintle 118. Pintle head 132 may reside within the first end second bore and orifice plate 108 may reside within the second end bore. Cylindrical pole piece 122, spring pre-loader 138, spring 136, electromagnetic coil 180, cylindrical inner lower body 104, pintle 118, guide plate 107, pintle head 132 and orifice plate 108 may be part of a single cartridge for easy insertion into injector body upper section 102a, such as into a central chamber.

Guide plate 107 may define one or more through slots or holes 109 for passage of fluid. Alternatively, guide plate 107 and pintle 118 together may define one or more through slots or holes 109 therebetween for passage of fluid. Pintle head 132 may define at least one through hole 316 for passage of fluid. Orifice plate 108 and inner lower body second end may define a distribution chamber 171 therebetween. Orifice plate 108 may define a plurality of grooves 322 for passage of fluid to exit orifice 110 for exit from injector 101. Interior surface of injector body lower section 102b and inner lower body exterior surface may define a fluid passage 304. Inner lower body 104 may define a distribution passage 308 fluidly linked to passage 304 defined by an interior surface of the injector body lower section and an exterior surface of the inner lower body (FIGS. 18 and 48). Inner lower body 104 may define a return passage 312 that fluidly links inner lower body central bore 106 and distribution chamber 171 defined by orifice plate 108 and inner lower body second end. Solid pintle 118 may reside within longitudinal central bore 106 for passage of fluid around an exterior of solid pintle 118 and through longitudinal central bore 106.

The present disclosure offers many advantages. Injectors 100, 101 offer a reduction in physical size over previous injectors, which reduces material cost, improves packaging and also reduces absorbed heat from a hot exhaust system. Injectors 100, 101 may eliminate threaded joints and instead utilize press fits, which are self-fixturing, that are subsequently welded. Injectors 100, 101 may eliminate O-rings in comparison to previous injectors, especially in the injector body lower section and inner lower body where exposure to relatively high temperatures is likely to occur. Injectors 100, 101 improve the response time (open and close time) of the injector (lifting up and down of pintle 118, thus uncovering and covering respectively, orifice 110 of orifice plate 108) to permit higher turn down ratios to be achieved, thus requiring a smaller number of discreet injectors to cover a particular range of dosing requirements, which reduces inventory and improves efficiency of scale. Injectors 100, 101 exhibit an improvement in dosing accuracy and repeatability, including a reduction in sensitivity to battery voltage, return flow rate and injector body temperature variations. Injectors 100, 101 exhibit a relocation of fluid connectors (e.g. location of fluid inlet 168 and fluid outlet 170) to injector body upper section 102a, thereby improving resistance to radiated heat and heat convection from hot exhaust system 18, for example, in the event that fluid inlet 168 and fluid outlet 170 are made of a plastic material or other material that is heat-sensitive. Injectors 100, 101 route the coolest fluid, which may be from inlet port 167, through the most heat sensitive component, such as solenoid coil 180, on the fluid's flow to what may be the hottest part of injectors 100, 101, such as orifice plate 108, from which heat is extracted, thereby maintaining injector serviceability despite exhaust gas temperatures of about 800° C. Injector surfaces have relatively large exposed external surface areas while keeping all enclosed volumes low for effective heat transfer to internal fluid.

All injector return flow passages, such as those fluid passages through which fluid flows after passing through distribution chamber 171, by comparison, may have a lower internal surface area than flow passages leading up to distribution chamber 171 to reduce heat transfer of the warmed fluid to sensitive components as it makes its way to outlet port 167. Orifice plate 108 may be made from carbide due to carbide's compatibility with brazing processes, high hardness capabilities and material toughness. Carbide further has the advantage of being moldable, thus relatively small, intricate components can be mass produced in a cost effective manner with virtually no finishing operations compared to components machined from heat treatable steels. Injectors 100, 101 utilize a mount against exhaust system 18 that utilizes materials impervious to the temperatures expected in service on a diesel exhaust after treatment system. Moreover, the system does not rely on carbon-based gaskets. Insulator 204 in an injector mount may be attached and sealed to the "hot" side of any mount joint by a means resistant to temperatures approaching 700° C., such as a nickel braze. The cool side of any mount joint may be sealed by a conventional Viton O-ring to provide reliable low leak performance. Insulator 204 should have low porosity to permit an O-ring to seal effectively to insulator 204, regardless of which side or surface O-ring is disposed. For instance, O-ring 203 may be installed as depicted in FIG. 42, such as between insulator 204 and injector body, such as injector body lower section 102b, or installed between mounting flange 200' and insulator 204, or between retaining plate 226 and insulator 204, such as against an underside of retaining plate 226. Injectors 100, 101 also provide an advantage in that when pintle 118 is lifted and uncovers orifice 110, only the fluid that exits injectors 100, 101 through orifice 110, is what passes through slots 322, and during periods of non-injection, bypass return flow, which passes around and not through slots 322, is directed back through injectors 100, 101 to cool injector components.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

It should now be appreciated that the present invention provides advantageous methods and apparatus for injecting an aqueous urea solution into the exhaust stream of a diesel engine in order to reduce NOx emissions. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An injector for injecting reagent, the injector comprising:
   an upper injector body;
   a lower injector body coupled with the upper injector body;
   a cylindrical pole piece disposed within at least one of the upper injector body and the lower injector body, the cylindrical pole piece defining a pole piece first end, a pole piece second end and a hollow interior extending from the pole piece first end to the pole piece second end;
   a spring located within at least a portion of the hollow interior;
   an electromagnetic coil secured around a bobbin, the electromagnetic coil surrounding an outside diameter of the cylindrical pole piece, wherein the cylindrical pole piece, spring and electromagnetic coil reside within at least one of the upper injector body and the lower injector body;
   a cylindrical inner lower body having an inner lower body first end and an opposing inner lower body second end and a longitudinal central bore extending therebetween, the inner lower body first end having a first end bore with a diameter larger than a diameter of the longitudinal central bore; and an orifice plate coupled to the inner lower body second end, the orifice plate and the inner lower body second end define a first chamber therebetween, wherein the inner lower body defines a return passage that fluidly links the inner lower body central bore and the first chamber.

2. The injector of claim 1, further comprising:
a solid pintle residing within the longitudinal central bore;
a pintle head surrounding an end of the pintle, the pintle head residing within the first end bore and contacting the spring such that the spring biases the pintle into a closed position.

3. The injector of claim 2, wherein the cylindrical pole piece, spring, cylindrical inner lower body, pintle, pintle head and orifice plate are part of a single cartridge.

4. The injector of claim 3, further comprising:
the upper injector body defining a chamber, wherein the single cartridge inserts into and resides within the chamber.

5. The injector of claim 2, wherein the pintle head define at least one through hole therebetween for passage of fluid.

6. The injector of claim 2, wherein the pintle head defines at least one through hole for passage of fluid, the at least one through hole extending to a second chamber coaxially aligned with the longitudinal central bore and in fluid communication therewith.

7. The injector of claim 1, wherein the orifice plate defines a plurality of grooves for passage of fluid.

8. The injector of claim 1, wherein the cylindrical inner lower body defines a plurality of grooves for passage of fluid.

9. The injector of claim 1, wherein an interior surface of the lower injector body and an exterior surface of the inner lower body together define a pathway.

10. The injector of claim 9, wherein the inner lower body defines a distribution passage fluidly linked to the pathway.

11. The injector of claim 2, further comprising:
a fluid sleeve being disposed between the cylindrical pole piece and at least a portion of the electromagnetic coil, the fluid sleeve further being disposed between the pintle head and at least a portion of the electromagnetic coil.

12. An injector for injecting reagent, the injector comprising:
an upper injector body;
a lower injector body coupled with the upper injector body;
a cylindrical pole piece disposed within at least one of the upper injector body and the lower injector body, the cylindrical pole piece defining a pole piece first end, a pole piece second end and a hollow interior extending from the pole piece first end to the pole piece second end;
a spring located within at least a portion of the hollow interior;
an electromagnetic coil secured around a bobbin, the electromagnetic coil surrounding an outside diameter of the cylindrical pole piece, wherein the cylindrical pole piece, spring and electromagnetic coil reside within at least one of the upper injector body and the lower injector body;
a cylindrical inner lower body having an inner lower body first end and an opposing inner lower body second end and a longitudinal central bore extending therebetween, the inner lower body first end having a first end bore with a diameter larger than a diameter of the longitudinal central bore;
a solid pintle residing within the longitudinal central bore;
a pintle head surrounding an end of the pintle, the pintle head residing within the first end bore and contacting the spring such that the spring biases the pintle into a closed position;
an orifice plate coupled to the inner lower body second end; and
the orifice plate and the inner lower body second end define a chamber therebetween,
wherein the inner lower body defines a return passage that fluidly links the inner lower body central bore and the chamber.

13. The injector of claim 12, wherein the solid pintle resides within the longitudinal central bore for passage of fluid around the solid pintle.

14. The injector of claim 11, wherein the fluid sleeve comprises:
a pair of flux bridges having a flux break disposed therebetween.

15. The injector of claim 14, wherein at least one of the pair of flux bridges and the flux break define a fluid path therethrough.

16. The injector of claim 14, wherein the pair of flux bridges is made of a magnetic material and the flux break is made of a non-magnetic material.

* * * * *

UNITED STATES PATENT AND TRADEMARK OFFICE
CERTIFICATE OF CORRECTION

PATENT NO. : 8,740,113 B2
APPLICATION NO. : 13/164976
DATED : June 3, 2014
INVENTOR(S) : Matthew L. Roessle et al.

It is certified that error appears in the above-identified patent and that said Letters Patent is hereby corrected as shown below:

In the Claims

Col. 26, line 65, claim 1, delete "haying" and insert --having--.

Col. 27, line 1, claim 1, delete "haying" and insert --having--.

Signed and Sealed this
Thirtieth Day of September, 2014

Michelle K. Lee
*Deputy Director of the United States Patent and Trademark Office*